United States Patent
Doiron et al.

(10) Patent No.: US 12,411,915 B2
(45) Date of Patent: Sep. 9, 2025

(54) STORING A PROGRAM ON A BLOCKCHAIN

(71) Applicant: nChain Holdings Limited, St. John's (AG)

(72) Inventors: Brock Doiron, London (GB); Craig Steven Wright, London (GB)

(73) Assignee: nChain Licensing AG, Zug (CH)

( * ) Notice: Subject to any disclaimer, the term of this patent is extended or adjusted under 35 U.S.C. 154(b) by 595 days.

(21) Appl. No.: 17/642,144

(22) PCT Filed: Aug. 21, 2020

(86) PCT No.: PCT/IB2020/057858
§ 371 (c)(1),
(2) Date: Mar. 10, 2022

(87) PCT Pub. No.: WO2021/048665
PCT Pub. Date: Mar. 18, 2021

(65) Prior Publication Data
US 2022/0358189 A1    Nov. 10, 2022

(30) Foreign Application Priority Data
Sep. 12, 2019 (GB) ...................................... 1913145

(51) Int. Cl.
*G06F 21/12* (2013.01)
*G06F 21/60* (2013.01)
*H04L 9/00* (2022.01)

(52) U.S. Cl.
CPC ............ *G06F 21/12* (2013.01); *G06F 21/602* (2013.01); *H04L 9/50* (2022.05)

(58) Field of Classification Search
CPC ........... G06F 21/12; G06F 21/602; H04L 9/50
See application file for complete search history.

(56) References Cited

U.S. PATENT DOCUMENTS 10,698,728 B1 * 6/2020 Nelson ...................... H04L 9/50
10,846,416 B2 * 11/2020 Uhr ........................ G06F 21/608
(Continued)

FOREIGN PATENT DOCUMENTS

CN    109074565 A    12/2018
CN    110692071 A    1/2020
(Continued)

OTHER PUBLICATIONS

Donald E. Knuth, Structured Programming with go to Statements, Computing Surveys, Dec. 1974, pp. 261-301, vol. 6, No. 4, Stanford University, Stanford, California, US.
(Continued)

*Primary Examiner* — Lizbeth Torres-Diaz
(74) *Attorney, Agent, or Firm* — Messner Reeves LLP

(57) ABSTRACT

A method comprising: retrieving a header file from a first transaction recorded on a blockchain maintained across a plurality of nodes of a blockchain network. The header file comprises: program header information, and reference information comprising one or more respective transaction IDs of one or more respective second transactions stored on the blockchain. Each second transaction comprises a respective section of a body of the program file, at least one of the sections comprising runnable program code. The method comprises, from the blockchain, retrieving the respective section of the program file from at least one of the second transactions based on the reference information; and running a program comprising the program header information and the at least one retrieved section.

20 Claims, 7 Drawing Sheets

(56) References Cited

U.S. PATENT DOCUMENTS

| | | | |
|---|---|---|---|
| 11,201,746 B2* | 12/2021 | Ranganathan | ........ H04L 9/3247 |
| 11,515,999 B1* | 11/2022 | Nelson | .................. H04L 9/0637 |
| 2018/0096349 A1* | 4/2018 | McDonald | ............. G06Q 20/20 |
| 2019/0116024 A1 | 4/2019 | Wright et al. | |
| 2019/0149337 A1 | 5/2019 | Savanah et al. | |
| 2019/0199516 A1 | 6/2019 | Carver et al. | |
| 2019/0392489 A1 | 12/2019 | Tietzen et al. | |
| 2020/0195442 A1 | 6/2020 | Wright et al. | |
| 2020/0266985 A1 | 8/2020 | Covaci et al. | |
| 2020/0351235 A1* | 11/2020 | Shang | .................. H04L 12/4641 |
| 2021/0233074 A1 | 7/2021 | Kramer et al. | |
| 2022/0051236 A1 | 2/2022 | Wright | |
| 2022/0261805 A1 | 8/2022 | Tartan et al. | |
| 2022/0269810 A1 | 8/2022 | Tartan et al. | |
| 2023/0185767 A1* | 6/2023 | Hung | .................... G06F 16/152 |
| | | | 713/189 |

FOREIGN PATENT DOCUMENTS

| | | | |
|---|---|---|---|
| CN | 111316595 A | | 6/2020 |
| CN | 111316615 A | | 6/2020 |
| CN | 110062034 B | | 11/2021 |
| JP | 2019220148 A | | 12/2019 |
| JP | 2020504930 A | | 2/2020 |
| KR | 20190076197 | | 7/2019 |
| KR | 20190076197 A | | 7/2019 |
| WO | 2009045257 A1 | | 4/2009 |
| WO | 2017145006 A1 | | 8/2017 |
| WO | 2017195160 | | 11/2017 |
| WO | 2017195160 A1 | | 11/2017 |
| WO | 2019008531 A1 | | 1/2019 |
| WO | 2019116248 A1 | | 6/2019 |
| WO | 2020109907 | | 6/2020 |
| WO | 2020109907 A1 | | 6/2020 |
| WO | 2020109908 | | 6/2020 |
| WO | 2020109908 A1 | | 6/2020 |
| WO | 2020109909 | | 6/2020 |
| WO | 2020109909 A1 | | 6/2020 |
| WO | 2020109910 | | 6/2020 |
| WO | 2020109910 A1 | | 6/2020 |
| WO | 2020109911 | | 6/2020 |
| WO | 2020109911 A1 | | 6/2020 |
| WO | 2020109912 | | 6/2020 |
| WO | 2020109912 A1 | | 6/2020 |
| WO | 2020109913 | | 6/2020 |
| WO | 2020109913 A1 | | 6/2020 |
| WO | 2020110025 | | 6/2020 |
| WO | 2020110025 A1 | | 6/2020 |
| WO | 2020212796 | | 10/2020 |
| WO | 2020212796 A1 | | 10/2020 |
| WO | 2021048663 | | 3/2021 |
| WO | 2021048663 A1 | | 3/2021 |
| WO | WO-2021119210 A1 * | 6/2021 | ........... G06Q 20/023 |

OTHER PUBLICATIONS

Andrew Sward et al., Data Insertion in Bitcoin's Blockchain, Mar. 4, 2018, pp. 2379-5980, URL: http://ledger.pitt.edu/ojs/ledger/article/view/101/93.

PCT/IB2020/057858, International Search Report and Written Opinion dated Nov. 6, 2020.

GB1913145.7 Search Report dated Mar. 16, 2020.

International Search Report and Written Opinion issued in International Application No. PCT/IB2020/057796, mailed on Nov. 10, 2020, 53 pages.

International Search Report and Written Opinion issued in International Application No. PCT/IB2020/057858, mailed on Nov. 6, 2020, 16 pages.

Knuth D. E., "Structured Programming with go to Statements," Computing Surveys, Stanford University, Stanford, California, US, Dec. 1974, vol. 6, No. 4, 54 pages.

Search Report for the Application No. GB1913143.2 dated Jun. 1, 2020, 14 pages.

Search Report for the Application No. GB1913145.7 dated Mar. 16, 2020, 4 pages.

Sward A., et al., "Data Insertion in Bitcoin's Blockchain," Mar. 4, 2018, ISSN 2379-5980, 23 pages Retrieved from Internet: URL: http://ledger.pitt.edu/ojs/ledger/article/view/101/93.

Wood G., "Ethereum: A Secure Decentralised Generalised Transaction Ledger Final Draft-Under Review," Jun. 4, 2014, 32 pages, Retrieved from Internet: URL: http://gavwood.com/paper.pdf.

Gupta A., "Cloud Computing Security Using Blockchain," Journal of Emerging Technologies and Innovative Research (JETIR), Jun. 2019, vol. 6(6), pp. 791-794.

* cited by examiner

| Input(s) | Output(s) |
|---|---|
| Input<br>• Pointer to previous $Tx$<br>• Index of UTXO in previous $Tx$<br>• Unlocking script for unlocking from previous party<br>⋮<br>Optional further inputs<br>⋮ | $UTXO_0$<br>• Amount<br>• Locking script locking to Alice<br>⋮<br>Optional further $UXTOs$<br>⋮ |

$TxID_0$ (201), 202, 203

$Tx_1$ (152j)

| Input(s) | Output(s) |
|---|---|
| Input<br>• Pointer to $Tx_0$<br>• Index of $UTXO_0$ [within $Tx_0$]<br>• Unlocking script for unlocking $UTXO_0$ from Alice<br>⋮<br>Optional further inputs<br>⋮ | $UTXO_1$<br>• Amount<br>• Locking script locking to Bob<br>⋮<br>Optional further $UXTOs$<br>⋮ |

$TxID_1$ (201), 202, 203

Transaction from Alice to Bob

↓

Validated by running: Alice's locking script (from output of $Tx_0$), together with Alice's unlocking script (as input to $Tx_1$). This checks that $Tx_1$ meets the condition(s) defined in Alice's locking script.

Figure 3
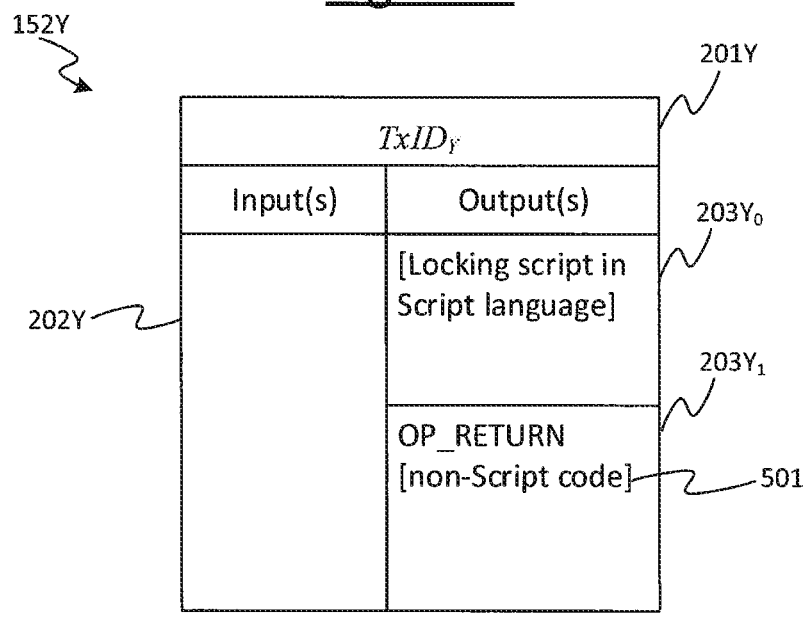
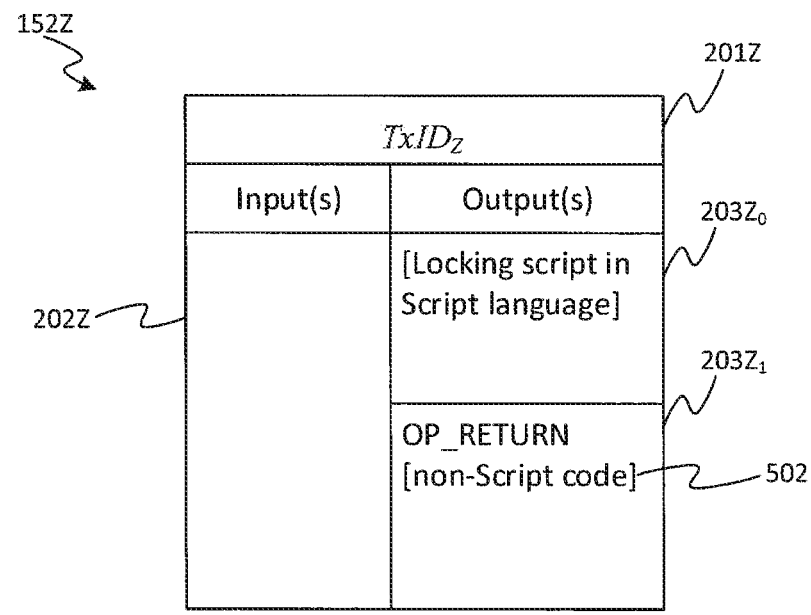

STORING A PROGRAM ON A BLOCKCHAIN

CROSS REFERENCE TO RELATED APPLICATIONS

This application is the U.S. National Stage of International Application No. PCT/IB2020/057858 filed on Aug. 21, 2020, which claims the benefit of United Kingdom Patent Application No. 1913145.7, filed on Sep. 12, 2019, the contents of which are incorporated herein by reference in their entireties.

TECHNICAL FIELD

The present disclosure relates to a file format for storing runnable programs in transactions of a blockchain, and for launchings such programs therefrom.

BACKGROUND

A blockchain refers to a form of distributed data structure, wherein a duplicate copy of the blockchain is maintained at each of a plurality of nodes in a peer-to-peer (P2P) network. The blockchain comprises a chain of blocks of data, wherein each block comprises one or more transactions. Each transaction may point back to a preceding transaction in a sequence which may span one or more blocks. Transactions can be submitted to the network to be included in new blocks. New blocks are created by a process known as "mining", which involves each of a plurality of mining nodes competing to perform "proof-of-work", i.e. solving a cryptographic puzzle based on a pool of the pending transactions waiting to be included in blocks.

Each node in the network can have any one, two or all of three roles: forwarding, mining and storage. Forwarding nodes propagate transactions throughout the nodes of the network. Mining nodes perform the mining of transactions into blocks. Storage nodes each store their own copy of the mined blocks of the blockchain. In order to have a transaction recorded in the blockchain, a party sends the transaction to one of the nodes of the network to be propagated. Mining nodes which receive the transaction may race to mine the transaction into a new block. Each node is configured to respect the same node protocol, which will include one or more conditions for a transaction to be valid. Invalid transactions will not be propagated nor mined into blocks. Assuming the transaction is validated and thereby accepted onto the blockchain, then the transaction (including any user data) will thus remain stored at each of the nodes in the P2P network as an immutable public record.

The miner who successfully solved the proof-of-work puzzle to create the latest block is typically rewarded with a new transaction called a "generation transaction" which generates a new amount of the digital asset. The proof-of work incentivises miners not to cheat the system by including double-spending transactions in their blocks, since it requires a large amount of compute resource to mine a block, and a block that includes an attempt to double spend is likely not be accepted by other nodes.

In an "output-based" model (sometimes referred to as a UTXO-based model), the data structure of a given transaction comprises one or more inputs and one or more outputs. Any spendable output comprises an element specifying an amount of the digital asset, sometimes referred to as a UTXO ("unspent transaction output"). The output may further comprise a locking script specifying a condition for redeeming the output. Each input comprises a pointer to such an output in a preceding transaction, and may further comprise an unlocking script for unlocking the locking script of the pointed-to output. So consider a pair of transactions, call them a first and a second transaction (or "target" transaction). The first transaction comprises at least one output specifying an amount of the digital asset, and comprising a locking script defining one or more conditions of unlocking the output. The second, target transaction comprises at least one input, comprising a pointer to the output of the first transaction, and an unlocking script for unlocking the output of the first transaction.

In such a model, when the second, target transaction is sent to the P2P network to be propagated and recorded in the blockchain, one of the criteria for validity applied at each node will be that the unlocking script meets all of the one or more conditions defined in the locking script of the first transaction. Another will be that the output of the first transaction has not already been redeemed by another, earlier valid transaction. Any node that finds the target transaction invalid according to any of these conditions will not propagate it nor include it for mining into a block to be recorded in the blockchain.

An alternative type of transaction model is an account-based model. In this case each transaction does not define the amount to be transferred by referring back to the UTXO of a preceding transaction in a sequence of past transactions, but rather by reference to an absolute account balance. The current state of all accounts is stored by the miners separate to the blockchain and is updated constantly.

Conventionally the transactions in the blockchain are used to convey a digital asset, i.e. data acting as a store of value. However, a blockchain can also be exploited in order to layer additional functionality on top of the blockchain. For instance, blockchain protocols may allow for storage of additional payload data in a transaction (i.e. user data, or application content, as opposed to data fundamentally relating to how the transaction operates as a transaction on the blockchain network). For instance such payload data may be included an unspendable output of a transaction in an output-based model, e.g. by means of an OP_RETURN opcode included in the locking script which terminates the locking script when run at a node of the blockchain network and thus makes the output non-functional in terms of transacting with the input of another transaction. Modern blockchains are increasing the maximum data capacity that can be stored within a single transaction, enabling more complex data to be incorporated. For instance this may be used to store an electronic document on the blockchain, or even audio or video data.

It is also known to include a small block of executable code in the payload of a transaction. That is, code other than the locking and unlocking script in an output-based model, or other than the operative part of a smart contract in an account-based model. The executable code instead has some other, secondary or "layer 2" (i.e. application level) function. In other words, from the perspective of the transaction protocol employed by the blockchain network, the executable code is just like any other payload data. A client can download the code by inspecting part of the blockchain as stored on one of the storage nodes of the blockchain network, and accessing the code from the payload of the relevant transaction. The code can then be run locally on the client computer.

SUMMARY

However, while it has been known to include a small block of executable code in the payload of a transaction, the inventors are not aware of anyone having previously included a self-contained program on the blockchain.

Blockchains provide a decentralised and tamper-resistant alternative to conventional database servers with the potential to revolutionize the storage, access, and distribution of data. However, due to its infancy, it lacks the standardized architecture and network protocols to easily build applications and software without extensive knowledge of the underlying technology. For blockchains to reach the point where they are as fundamental an infrastructure as the internet, it is imperative to develop an easy-to-use protocol for accessing data stored on the blockchain by both users and software.

The following discloses a file format suitable for standardizing a range of blockchain-enabled applications. The disclosure establishes a means of storing executable software (i.e. runnable code) on the blockchain that can be reconstructed locally to be run on individual computers with permissioned access. This introduces a new blockchain-based file format for files stored on the blockchain that can be run locally or on a virtual machine.

According to one aspect disclosed herein, there is provided a method of running a program. The method comprises the following steps performed by computer equipment of a consuming party. Firstly, the method comprises retrieving a header file from a first transaction recorded on a blockchain maintained across a plurality of nodes of a blockchain network. The header file comprises: program header information, and reference information comprising one or more respective transaction IDs of one or more respective second transactions stored on the blockchain. Each of the second transactions comprises a respective section of a body of the program file, at least one of the sections comprising runnable program code. The method then comprises, from the blockchain, retrieving the respective section of the program file from at least one of the one or more second transactions based on the reference information; and running a program comprising the program header information and the at least one retrieved section.

In embodiments, permissions can be encoded in either the transaction storing the file or the file itself in order to allow for control over who can execute the file.

Embodiments may also integrate access to the blockchain into a high-level programming language to facilitate interaction between local software and the blockchain. There may be provided a request-response protocol for accessing data referenced by transaction hyperlinks within blockchain hypertext documents. For instance, the request-response protocol may be facilitated by a hypertext-enabled wallet to make requests via OP_RETURN flags.

The disclosure also discusses an example system architecture and computer architecture, and how components of the computer hardware and software may interact in implementing the disclosed techniques.

BRIEF DESCRIPTION OF THE DRAWINGS

To assist understanding of embodiments of the present disclosure and to show how such embodiments may be put into effect, reference is made, by way of example only, to the accompanying drawings in which:

FIG. 3 is a schematic block diagram of an example set of transactions for storing a program.

DETAILED DESCRIPTION OF EMBODIMENTS

Example System Overview

Figure 1:
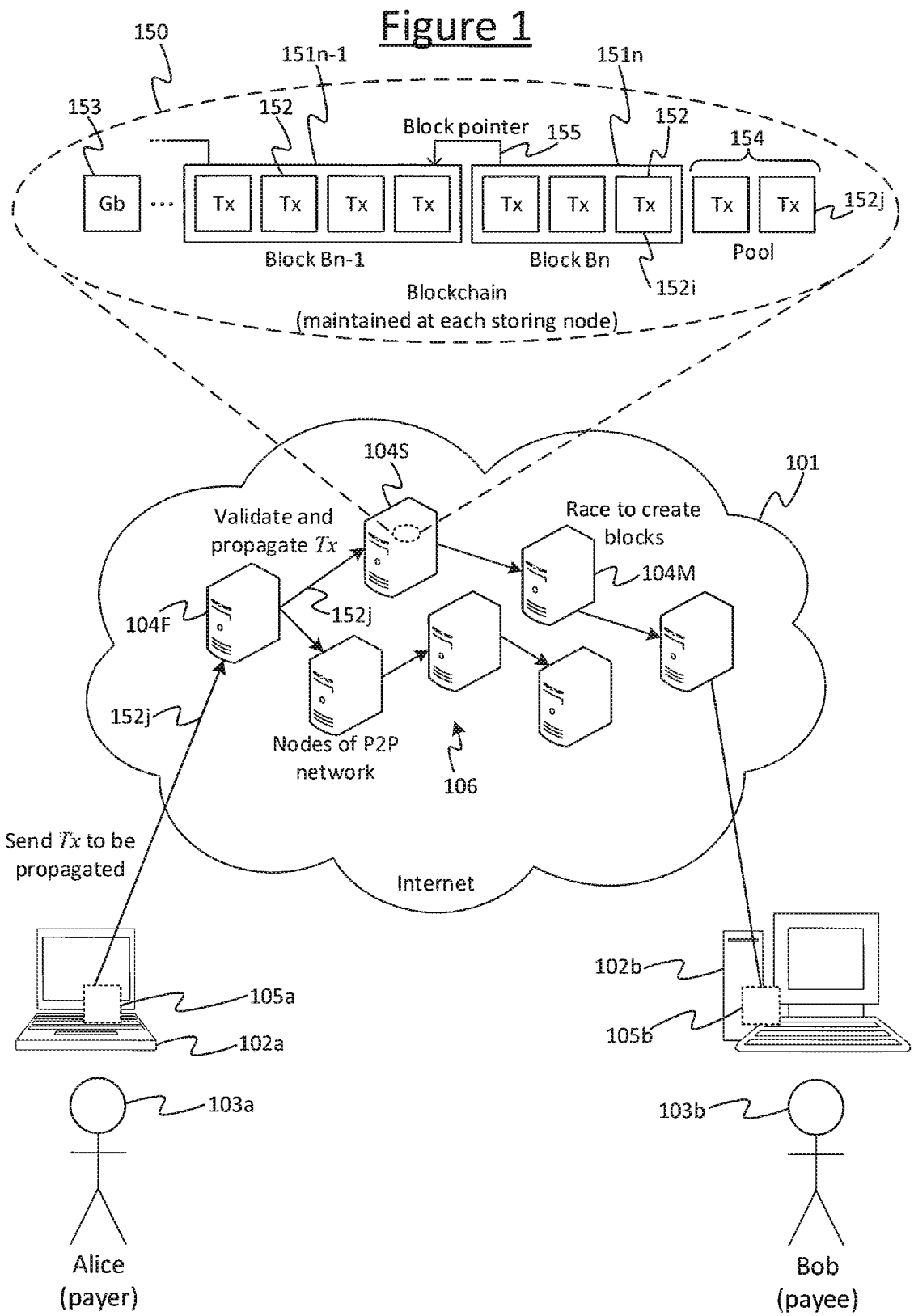
FIG. 1 is a schematic block diagram of a system for implementing a blockchain, FIG. 2 schematically illustrates some examples of transactions which may be recorded in a blockchain.

FIG. 1 shows an example system 100 for implementing a blockchain 150. The system 100 comprises a packet-switched network 101, typically a wide-area internetwork such as the Internet. The packet-switched network 101 comprises a plurality of nodes 104 arranged to form a peer-to-peer (P2P) overlay network 106 within the packet-switched network 101. Each node 104 comprises computer equipment of a peers, with different ones of the nodes 104 belonging to different peers. Each node 104 comprises processing apparatus comprising one or more processors, e.g. one or more central processing units (CPUs), accelerator processors, application specific processors and/or field programmable gate arrays (FPGAs). Each node also comprises memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive.

The blockchain 150 comprises a chain of blocks of data 151, wherein a respective copy of the blockchain 150 is maintained at each of a plurality of nodes in the P2P network 160. Each block 151 in the chain comprises one or more transactions 152, wherein a transaction in this context refers to a kind of data structure. The nature of the data structure will depend on the type of transaction protocol used as part of a transaction model or scheme. A given blockchain will typically use one particular transaction protocol throughout. In one common type of transaction protocol, the data structure of each transaction 152 comprises at least one input and at least one output. Each output specifies an amount representing a quantity of a digital asset belonging to a user 103 to whom the output is cryptographically locked (requiring a signature of that user in order to be unlocked and thereby redeemed or spent). Each input points back to the output of a preceding transaction 152, thereby linking the transactions.

At least some of the nodes 104 take on the role of forwarding nodes 104F which forward and thereby propagate transactions 152. At least some of the nodes 104 take on the role of miners 104M which mine blocks 151. At least some of the nodes 104 take on the role of storage nodes 104S (sometimes also called "full-copy" nodes), each of which stores a respective copy of the same blockchain 150 in their respective memory. Each miner node 104M also maintains a pool 154 of transactions 152 waiting to be mined into blocks 151. A given node 104 may be a forwarding node 104, miner 104M, storage node 104S or any combination of two or all of these.

In a given present transaction 152*j*, the (or each) input comprises a pointer referencing the output of a preceding transaction 152*i* in the sequence of transactions, specifying that this output is to be redeemed or "spent" in the present transaction 152*j*. In general, the preceding transaction could be any transaction in the pool 154 or any block 151. The preceding transaction 152*i* need not necessarily exist at the time the present transaction 152*j* is created or even sent to the network 106, though the preceding transaction 152*i* will need to exist and be validated in order for the present transaction to be valid. Hence "preceding" herein refers to a predecessor in a logical sequence linked by pointers, not necessarily the time of creation or sending in a temporal sequence, and hence it does not necessarily exclude that the transactions 152*i*, 152*j* be created or sent out-of-order (see discussion below on orphan transactions). The preceding transaction 152*i* could equally be called the antecedent or predecessor transaction.

The input of the present transaction 152*j* also comprises the signature of the user 103*a* to whom the output of the preceding transaction 152*i* is locked. In turn, the output of the present transaction 152*j* can be cryptographically locked to a new user 103*b*. The present transaction 152*j* can thus transfer the amount defined in the input of the preceding transaction 152*i* to the new user 103*b* as defined in the output of the present transaction 152*j*. In some cases a transaction 152 may have multiple outputs to split the input amount between multiple users (one of whom could be the original user 103*a* in order to give change). In some cases a transaction can also have multiple inputs to gather together the amounts from multiple outputs of one or more preceding transactions, and redistribute to one or more outputs of the current transaction.

The above may be referred to as an "output-based" transaction protocol, sometimes also referred to as an unspent transaction output (UTXO) type protocol (where the outputs are referred to as UTXOs). A user's total balance is not defined in any one number stored in the blockchain, and instead the user needs a special "wallet" application 105 to collate the values of all the UTXOs of that user which are scattered throughout many different transactions 152 in the blockchain 151.

An alternative type of transaction protocol may be referred to as an "account-based" protocol, as part of an account-based transaction model. In the account-based case, each transaction does not define the amount to be transferred by referring back to the UTXO of a preceding transaction in a sequence of past transactions, but rather by reference to an absolute account balance. The current state of all accounts is stored by the miners separate to the blockchain and is updated constantly. In such a system, transactions are ordered using a running transaction tally of the account (also called the "position"). This value is signed by the sender as part of their cryptographic signature and is hashed as part of the transaction reference calculation. In addition, an optional data field may also be signed the transaction. This data field may point back to a previous transaction, for example if the previous transaction ID is included in the data field.

With either type of transaction protocol, when a user 103 wishes to enact a new transaction 152*j*, then he/she sends the new transaction from his/her computer terminal 102 to one of the nodes 104 of the P2P network 106 (which nowadays are typically servers or data centres, but could in principle be other user terminals). This node 104 checks whether the transaction is valid according to a node protocol which is applied at each of the nodes 104. The details of the node protocol will correspond to the type of transaction protocol being used in the blockchain 150 in question, together forming the overall transaction model. The node protocol typically requires the node 104 to check that the cryptographic signature in the new transaction 152*j* matches the expected signature, which depends on the previous transaction 152*i* in an ordered sequence of transactions 152. In an output-based case, this may comprise checking that the cryptographic signature of the user included in the input of the new transaction 152*j* matches a condition defined in the output of the preceding transaction 152*i* which the new transaction spends, wherein this condition typically comprises at least checking that the cryptographic signature in the input of the new transaction 152*j* unlocks the output of the previous transaction 152*i* to which the input of the new transaction points. In some transaction protocols the condition may be at least partially defined by a custom script included in the input and/or output. Alternatively it could simply be a fixed by the node protocol alone, or it could be due to a combination of these. Either way, if the new transaction 152*j* is valid, the current node forwards it to one or more others of the nodes 104 in the P2P network 106. At least some of these nodes 104 also act as forwarding nodes 104F, applying the same test according to the same node protocol, and so forward the new transaction 152*j* on to one or more further nodes 104, and so forth. In this way the new transaction is propagated throughout the network of nodes 104.

In an output-based model, the definition of whether a given output (e.g. UTXO) is spent is whether it has yet been validly redeemed by the input of another, onward transaction 152*j* according to the node protocol. Another condition for a transaction to be valid is that the output of the preceding transaction 152*i* which it attempts to spend or redeem has not already been spent/redeemed by another valid transaction. Again if not valid, the transaction 152*j* will not be propagated or recorded in the blockchain. This guards against double-spending whereby the spender tries to spend the output of the same transaction more than once. An account-based model on the other hand guards against double-spending by maintaining an account balance. Because again there is a defined order of transactions, the account balance has a single defined state at any one time.

In addition to validation, at least some of the nodes 104M also race to be the first to create blocks of transactions in a process known as mining, which is underpinned by "proof of work". At a mining node 104M, new transactions are added to a pool of valid transactions that have not yet appeared in a block. The miners then race to assemble a new valid block 151 of transactions 152 from the pool of transactions 154 by attempting to solve a cryptographic puzzle. Typically this comprises searching for a "nonce" value such that when the nonce is concatenated with the pool of transactions 154 and hashed, then the output of the hash meets a predetermined condition. E.g. the predetermined condition may be that the output of the hash has a certain predefined number of leading zeros. A property of a hash function is that it has an unpredictable output with respect to its input. Therefore this search can only be performed by brute force, thus consuming a substantive amount of processing resource at each node 104M that is trying to solve the puzzle.

The first miner node 104M to solve the puzzle announces this to the network 106, providing the solution as proof which can then be easily checked by the other nodes 104 in the network (once given the solution to a hash it is straightforward to check that it causes the output of the hash to meet the condition). The pool of transactions 154 for which the winner solved the puzzle then becomes recorded as a new block 151 in the blockchain 150 by at least some of the nodes 104 acting as storage nodes 104S, based on having checked the winner's announced solution at each such node.

A block pointer 155 is also assigned to the new block 151n pointing back to the previously created block 151n-1 in the chain. The proof-of-work helps reduce the risk of double spending since it takes a large amount of effort to create a new block 151, and as any block containing a double spend is likely to be rejected by other nodes 104, mining nodes 104M are incentivised not to allow double spends to be included in their blocks. Once created, the block 151 cannot be modified since it is recognized and maintained at each of the storing nodes 104S in the P2P network 106 according to the same protocol. The block pointer 155 also imposes a sequential order to the blocks 151. Since the transactions 152 are recorded in the ordered blocks at each storage node 104S in a P2P network 106, this therefore provides an immutable public ledger of the transactions.

Note that different miners 104M racing to solve the puzzle at any given time may be doing so based on different snapshots of the unmined transaction pool 154 at any given time, depending on when they started searching for a solution. Whoever solves their respective puzzle first defines which transactions 152 are included in the next new block 151n, and the current pool 154 of unmined transactions is updated. The miners 104M then continue to race to create a block from the newly defined outstanding pool 154, and so forth. A protocol also exists for resolving any "fork" that may arise, which is where two miners 104M solve their puzzle within a very short time of one another such that a conflicting view of the blockchain gets propagated. In short, whichever prong of the fork grows the longest becomes the definitive blockchain 150.

In most blockchains the winning miner 104M is automatically rewarded with a special kind of new transaction which creates a new quantity of the digital asset out of nowhere (as opposed to normal transactions which transfer an amount of the digital asset from one user to another). Hence the winning node is said to have "mined" a quantity of the digital asset. This special type of transaction is sometime referred to as a "generation" transaction. It automatically forms part of the new block 151n. This reward gives an incentive for the miners 104M to participate in the proof-of-work race. Often a regular (non-generation) transaction 152 will also specify an additional transaction fee in one of its outputs, to further reward the winning miner 104M that created the block 151n in which that transaction was included.

Due to the computational resource involved in mining, typically at least each of the miner nodes 104M takes the form of a server comprising one or more physical server units, or even whole a data centre. Each forwarding node 104M and/or storage node 104S may also take the form of a server or data centre. However in principle any given node 104 could take the form of a user terminal or a group of user terminals networked together.

The memory of each node 104 stores software configured to run on the processing apparatus of the node 104 in order to perform its respective role or roles and handle transactions 152 in accordance with the node protocol. It will be understood that any action attributed herein to a node 104 may be performed by the software run on the processing apparatus of the respective computer equipment. The node software may be implemented in one or more applications at the application layer, or a lower layer such as the operating system layer or a protocol layer, or any combination of these. Also, the term "blockchain" as used herein is a generic term that refers to the kind of technology in general, and does not limit to any particular proprietary blockchain, protocol or service.

Also connected to the network 101 is the computer equipment 102 of each of a plurality of parties 103 in the role of consuming users. These act as payers and payees in transactions but do not necessarily participate in mining or propagating transactions on behalf of other parties. They do not necessarily run the mining protocol. Two parties 103 and their respective equipment 102 are shown for illustrative purposes: a first party 103a and his/her respective computer equipment 102a, and a second party 103b and his/her respective computer equipment 102b. It will be understood that many more such parties 103 and their respective computer equipment 102 may be present and participating in the system, but for convenience they are not illustrated. Each party 103 may be an individual or an organization. Purely by way of illustration the first party 103a is referred to herein as Alice and the second party 103b is referred to as Bob, but it will be appreciated that this is not limiting and any reference herein to Alice or Bob may be replaced with "first party" and "second "party" respectively.

The computer equipment 102 of each party 103 comprises respective processing apparatus comprising one or more processors, e.g. one or more CPUs, GPUs, other accelerator processors, application specific processors, and/or FPGAs. The computer equipment 102 of each party 103 further comprises memory, i.e. computer-readable storage in the form of a non-transitory computer-readable medium or media. This memory may comprise one or more memory units employing one or more memory media, e.g. a magnetic medium such as hard disk; an electronic medium such as an SSD, flash memory or EEPROM; and/or an optical medium such as an optical disc drive. The memory on the computer equipment 102 of each party 103 stores software comprising a respective instance of at least one client application 105 arranged to run on the processing apparatus. It will be understood that any action attributed herein to a given party 103 may be performed using the software run on the processing apparatus of the respective computer equipment 102. The computer equipment 102 of each party 103 comprises at least one user terminal, e.g. a desktop or laptop computer, a tablet, a smartphone, or a wearable device such as a smartwatch. The computer equipment 102 of a given party 103 may also comprise one or more other networked resources, such as cloud computing resources accessed via the user terminal.

The client application 105 may be initially provided to the computer equipment 102 of any given party 103 on suitable computer-readable storage medium or media, e.g. downloaded from a server, or provided on a removable storage device such as a removable SSD, flash memory key, removable EEPROM, removable magnetic disk drive, magnetic floppy disk or tape, optical disk such as a CD or DVD ROM, or a removable optical drive, etc.

The client application 105 comprises at least a "wallet" function. This has two main functionalities. One of these is to enable the respective user party 103 to create, sign and send transactions 152 to be propagated throughout the network of nodes 104 and thereby included in the blockchain 150. The other is to report back to the respective party the amount of the digital asset that he or she currently owns. In an output-based system, this second functionality comprises collating the amounts defined in the outputs of the various 152 transactions scattered throughout the blockchain 150 that belong to the party in question.

Note: whilst the various client functionality may be described as being integrated into a given client application 105, this is not necessarily limiting and instead any client functionality described herein may instead be implemented in a suite of two or more distinct applications, e.g. interfacing via an API, or one being a plug-in to the other. More generally the client functionality could be implemented at the application layer or a lower layer such as the operating system, or any combination of these. The following will be described in terms of a client application 105 but it will be appreciated that this is not limiting.

The instance of the client application or software 105 on each computer equipment 102 is operatively coupled to at least one of the forwarding nodes 104F of the P2P network 106. This enables the wallet function of the client 105 to send transactions 152 to the network 106. The client 105 is also able to contact one, some or all of the storage nodes 104 in order to query the blockchain 150 for any transactions of which the respective party 103 is the recipient (or indeed inspect other parties' transactions in the blockchain 150, since in embodiments the blockchain 150 is a public facility which provides trust in transactions in part through its public visibility). The wallet function on each computer equipment 102 is configured to formulate and send transactions 152 according to a transaction protocol. Each node 104 runs software configured to validate transactions 152 according to a node protocol, and in the case of the forwarding nodes 104F to forward transactions 152 in order to propagate them throughout the network 106. The transaction protocol and node protocol correspond to one another, and a given transaction protocol goes with a given node protocol, together implementing a given transaction model. The same transaction protocol is used for all transactions 152 in the blockchain 150 (though the transaction protocol may allow different subtypes of transaction within it). The same node protocol is used by all the nodes 104 in the network 106 (though it many handle different subtypes of transaction differently in accordance with the rules defined for that subtype, and also different nodes may take on different roles and hence implement different corresponding aspects of the protocol).

As mentioned, the blockchain 150 comprises a chain of blocks 151, wherein each block 151 comprises a set of one or more transactions 152 that have been created by a proof-of-work process as discussed previously. Each block 151 also comprises a block pointer 155 pointing back to the previously created block 151 in the chain so as to define a sequential order to the blocks 151. The blockchain 150 also comprises a pool of valid transactions 154 waiting to be included in a new block by the proof-of-work process. Each transaction 152 (other than a generation transaction) comprises a pointer back to a previous transaction so as to define an order to sequences of transactions (N.B. sequences of transactions 152 are allowed to branch). The chain of blocks 151 goes all the way back to a genesis block (Gb) 153 which was the first block in the chain. One or more original transactions 152 early on in the chain 150 pointed to the genesis block 153 rather than a preceding transaction.

When a given party 103, say Alice, wishes to send a new transaction 152j to be included in the blockchain 150, then she formulates the new transaction in accordance with the relevant transaction protocol (using the wallet function in her client application 105). She then sends the transaction 152 from the client application 105 to one of the one or more forwarding nodes 104F to which she is connected. E.g. this could be the forwarding node 104F that is nearest or best connected to Alice's computer 102. When any given node 104 receives a new transaction 152j, it handles it in accordance with the node protocol and its respective role. This comprises first checking whether the newly received transaction 152j meets a certain condition for being "valid", examples of which will be discussed in more detail shortly. In some transaction protocols, the condition for validation may be configurable on a per-transaction basis by scripts included in the transactions 152. Alternatively the condition could simply be a built-in feature of the node protocol, or be defined by a combination of the script and the node protocol.

On condition that the newly received transaction 152j passes the test for being deemed valid (i.e. on condition that it is "validated"), any storage node 104S that receives the transaction 152j will add the new validated transaction 152 to the pool 154 in the copy of the blockchain 150 maintained at that node 104S. Further, any forwarding node 104F that receives the transaction 152j will propagate the validated transaction 152 onward to one or more other nodes 104 in the P2P network 106. Since each forwarding node 104F applies the same protocol, then assuming the transaction 152j is valid, this means it will soon be propagated throughout the whole P2P network 106.

Once admitted to the pool 154 in the copy of the blockchain 150 maintained at one or more storage nodes 104, then miner nodes 104M will start competing to solve the proof-of-work puzzle on the latest version of the pool 154 including the new transaction 152 (other miners 104M may still be trying to solve the puzzle based on the old view of the pool 154, but whoever gets there first will define where the next new block 151 ends and the new pool 154 starts, and eventually someone will solve the puzzle for a part of the pool 154 which includes Alice's transaction 152j). Once the proof-of-work has been done for the pool 154 including the new transaction 152j, it immutably becomes part of one of the blocks 151 in the blockchain 150. Each transaction 152 comprises a pointer back to an earlier transaction, so the order of the transactions is also immutably recorded.

Different nodes 104 may receive different instances of a given transaction first and therefore have conflicting views of which instance is 'valid' before one instance is mined into a block 150, at which point all nodes 104 agree that the mined instance is the only valid instance. If a node 104 accepts one instance as valid, and then discovers that a second instance has been recorded in the blockchain 150 then that node 104 must accept this and will discard (i.e. treat as invalid) the unmined instance which it had initially accepted.

UTXO-Based Model

FIG. 2 illustrates an example transaction protocol. This is an example of an UTXO-based protocol. A transaction 152 (abbreviated "Tx") is the fundamental data structure of the blockchain 150 (each block 151 comprising one or more transactions 152). The following will be described by reference to an output-based or "UTXO" based protocol. However, this not limiting to all possible embodiments.

In a UTXO-based model, each transaction ("Tx") 152 comprises a data structure comprising one or more inputs 202, and one or more outputs 203. Each output 203 may comprise an unspent transaction output (UTXO), which can be used as the source for the input 202 of another new transaction (if the UTXO has not already been redeemed). The UTXO specifies an amount of a digital asset (a store of value). It may also contain the transaction ID of the transaction from which it came, amongst other information. The transaction data structure may also comprise a header 201, which may comprise an indicator of the size of the input field(s) 202 and output field(s) 203. The header 201 may also include an ID of the transaction. In embodiments the transaction ID is the hash of the transaction data (excluding the transaction ID itself) and stored in the header 201 of the raw transaction 152 submitted to the miners 104M.

Say Alice 103a wishes to create a transaction 152j transferring an amount of the digital asset in question to Bob 103b. In FIG. 2 Alice's new transaction 152j is labelled "$Tx_1$". It takes an amount of the digital asset that is locked to Alice in the output 203 of a preceding transaction 152i in the sequence, and transfers at least some of this to Bob. The preceding transaction 152i is labelled "$Tx_0$" in FIG. 2. $Tx_0$ and $Tx_1$ are just an arbitrary labels. They do not necessarily mean that $Tx_0$ is the first transaction in the blockchain 151, nor that $Tx_1$ is the immediate next transaction in the pool 154. $Tx_1$ could point back to any preceding (i.e. antecedent) transaction that still has an unspent output 203 locked to Alice.

The preceding transaction $Tx_0$ may already have been validated and included in the blockchain 150 at the time when Alice creates her new transaction $Tx_1$, or at least by the time she sends it to the network 106. It may already have been included in one of the blocks 151 at that time, or it may be still waiting in the pool 154 in which case it will soon be included in a new block 151. Alternatively $Tx_0$ and Tx could be created and sent to the network 102 together, or $Tx_0$ could even be sent after $Tx_1$ if the node protocol allows for buffering "orphan" transactions. The terms "preceding" and "subsequent" as used herein in the context of the sequence of transactions refer to the order of the transactions in the sequence as defined by the transaction pointers specified in the transactions (which transaction points back to which other transaction, and so forth). They could equally be replaced with "predecessor" and "successor", or "antecedent" and "descendant", "parent" and "child", or such like. It does not necessarily imply an order in which they are created, sent to the network 106, or arrive at any given node 104. Nevertheless, a subsequent transaction (the descendent transaction or "child") which points to a preceding transaction (the antecedent transaction or "parent") will not be validated until and unless the parent transaction is validated. A child that arrives at a node 104 before its parent is considered an orphan. It may be discarded or buffered for a certain time to wait for the parent, depending on the node protocol and/or miner behaviour.

One of the one or more outputs 203 of the preceding transaction $Tx_0$ comprises a particular UTXO, labelled here $UTXO_0$. Each UTXO comprises a value specifying an amount of the digital asset represented by the UTXO, and a locking script which defines a condition which must be met by an unlocking script in the input 202 of a subsequent transaction in order for the subsequent transaction to be validated, and therefore for the UTXO to be successfully redeemed. Typically the locking script locks the amount to a particular party (the beneficiary of the transaction in which it is included). I.e. the locking script defines an unlocking condition, typically comprising a condition that the unlocking script in the input of the subsequent transaction comprises the cryptographic signature of the party to whom the preceding transaction is locked.

The locking script (aka scriptPubKey) is a piece of code written in the domain specific language recognized by the node protocol. A particular example of such a language is called "Script" (capital S). The locking script specifies what information is required to spend a transaction output 203, for example the requirement of Alice's signature. Unlocking scripts appear in the outputs of transactions. The unlocking script (aka scriptSig) is a piece of code written the domain specific language that provides the information required to satisfy the locking script criteria. For example, it may contain Bob's signature. Unlocking scripts appear in the input 202 of transactions.

So in the example illustrated, $UTXO_0$ in the output 203 of $Tx_0$ comprises a locking script [Checksig $P_A$] which requires a signature Sig $P_A$ of Alice in order for $UTXO_0$ to be redeemed (strictly, in order for a subsequent transaction attempting to redeem $UTXO_0$ to be valid). [Checksig $P_A$] contains the public key $P_A$ from a public-private key pair of Alice. The input 202 of $Tx_1$ comprises a pointer pointing back to $Tx_1$ (e.g. by means of its transaction ID, $TxID_0$, which in embodiments is the hash of the whole transaction $Tx_0$). The input 202 of $Tx_1$ comprises an index identifying $UTXO_0$ within $Tx_0$, to identify it amongst any other possible outputs of $Tx_0$. The input 202 of $Tx_1$ further comprises an unlocking script <Sig $P_A$> which comprises a cryptographic signature of Alice, created by Alice applying her private key from the key pair to a predefined portion of data (sometimes called the "message" in cryptography). What data (or "message") needs to be signed by Alice to provide a valid signature may be defined by the locking script, or by the node protocol, or by a combination of these.

When the new transaction $Tx_1$ arrives at a node 104, the node applies the node protocol. This comprises running the locking script and unlocking script together to check whether the unlocking script meets the condition defined in the locking script (where this condition may comprise one or more criteria). In embodiments this involves concatenating the two scripts:

$$<\text{Sig } P_A> <P_A>\|[\text{Checksig } P_A]$$

where "$\|$" represents a concatenation and "< . . . >" means place the data on the stack, and "[ . . . ]" is a function comprised by the unlocking script (in this example a stack-based language). Equivalently the scripts may be run one after the other, with a common stack, rather than concatenating the scripts. Either way, when run together, the scripts use the public key $P_A$ of Alice, as included in the locking script in the output of $Tx_0$, to authenticate that the locking script in the input of $Tx_1$ contains the signature of Alice signing the expected portion of data. The expected portion of data itself (the "message") also needs to be included in $Tx_0$ order to perform this authentication. In embodiments the signed data comprises the whole of $Tx_0$ (so a separate element does to need to be included specifying the signed portion of data in the clear, as it is already inherently present).

The details of authentication by public-private cryptography will be familiar to a person skilled in the art. Basically, if Alice has signed a message by encrypting it with her private key, then given Alice's public key and the message in the clear (the unencrypted message), another entity such as a node 104 is able to authenticate that the encrypted version of the message must have been signed by Alice. Signing typically comprises hashing the message, signing the hash, and tagging this onto the clear version of the message as a signature, thus enabling any holder of the public key to authenticate the signature. Note therefore that any reference herein to signing a particular piece of data or part of a transaction, or such like, can in embodiments mean signing a hash of that piece of data or part of the transaction.

If the unlocking script in $Tx_1$ meets the one or more conditions specified in the locking script of $Tx_0$ (so in the example shown, if Alice's signature is provided in $Tx_1$ and authenticated), then the node 104 deems $Tx_1$ valid. If it is a mining node 104M, this means it will add it to the pool of transactions 154 awaiting proof-of-work. If it is a forwarding node 104F, it will forward the transaction $Tx_1$ to one or more other nodes 104 in the network 106, so that it will be propagated throughout the network. Once $Tx_1$ has been validated and included in the blockchain 150, this defines $UTXO_0$ from $Tx_0$ as spent. Note that $Tx_1$ can only be valid if it spends an unspent transaction output 203. If it attempts to spend an output that has already been spent by another transaction 152, then $Tx_1$ will be invalid even if all the other conditions are met. Hence the node 104 also needs to check whether the referenced UTXO in the preceding transaction $Tx_0$ is already spent (has already formed a valid input to another valid transaction). This is one reason why it is important for the blockchain 150 to impose a defined order on the transactions 152. In practice a given node 104 may maintain a separate database marking which UTXOs 203 in which transactions 152 have been spent, but ultimately what defines whether a UTXO has been spent is whether it has already formed a valid input to another valid transaction in the blockchain 150.

If the total amount specified in all the outputs 203 of a given transaction 152 is greater than the total amount pointed to by all its inputs 202, this is another basis for invalidity in most transaction models. Therefore such transactions will not be propagated nor mined into blocks 151.

Note that in UTXO-based transaction models, a given UTXO needs to be spent as a whole. It cannot "leave behind" a fraction of the amount defined in the UTXO as spent while another fraction is spent. However the amount from the UTXO can be split between multiple outputs of the next transaction. E.g. the amount defined in $UTXO_0$ in $Tx_0$ can be split between multiple UTXOs in $Tx_1$. Hence if Alice does not want to give Bob all of the amount defined in $UTXO_0$, she can use the remainder to give herself change in a second output of $Tx_1$, or pay another party.

In practice Alice will also usually need to include a fee for the winning miner, because nowadays the reward of the generation transaction alone is not typically sufficient to motivate mining. If Alice does not include a fee for the miner, $Tx_0$ will likely be rejected by the miner nodes 104M, and hence although technically valid, it will still not be propagated and included in the blockchain 150 (the miner protocol does not force miners 104M to accept transactions 152 if they don't want). In some protocols, the mining fee does not require its own separate output 203 (i.e. does not need a separate UTXO). Instead any different between the total amount pointed to by the input(s) 202 and the total amount of specified in the output(s) 203 of a given transaction 152 is automatically given to the winning miner 104. E.g. say a pointer to $UTXO_0$ is the only input to $Tx_1$, and $Tx_1$ has only one output $UTXO_1$. If the amount of the digital asset specified in $UTXO_0$ is greater than the amount specified in $UTXO_1$, then the difference automatically goes to the winning miner 104M. Alternatively or additionally however, it is not necessarily excluded that a miner fee could be specified explicitly in its own one of the UTXOs 203 of the transaction 152.

Alice and Bob's digital assets consist of the unspent UTXOs locked to them in any transactions 152 anywhere in the blockchain 150. Hence typically, the assets of a given party 103 are scattered throughout the UTXOs of various transactions 152 throughout the blockchain 150. There is no one number stored anywhere in the blockchain 150 that defines the total balance of a given party 103. It is the role of the wallet function in the client application 105 to collate together the values of all the various UTXOs which are locked to the respective party and have not yet been spent in another onward transaction. It can do this by querying the copy of the blockchain 150 as stored at any of the storage nodes 104S, e.g. the storage node 104S that is closest or best connected to the respective party's computer equipment 102.

Note that the script code is often represented schematically (i.e. not the exact language). For example, one may write [Checksig $P_A$] to mean [Checksig $P_A$]=OP_DUP OP_HASH160 <H($P_A$)>OP_EQUALVERIFY OP_CHECKSIG. "OP_..." refers to a particular opcode of the Script language. OP_CHECKSIG (also called "Checksig") is a Script opcode that takes two inputs (signature and public key) and verifies the signature's validity using the Elliptic Curve Digital Signature Algorithm (ECDSA). At runtime, any occurrences of signature ('sig') are removed from the script but additional requirements, such as a hash puzzle, remain in the transaction verified by the 'sig' input. As another example, OP_RETURN is an opcode of the Script language for creating an unspendable output of a transaction that can store metadata within the transaction, and thereby record the metadata immutably in the blockchain 150. E.g. the metadata could comprise a document which it is desired to store in the blockchain.

The signature $P_A$ is a digital signature. In embodiments this is based on the ECDSA using the elliptic curve secp256k1. A digital signature signs a particular piece of data. In embodiments, for a given transaction the signature will sign part of the transaction input, and all or part of the transaction output. The particular parts of the outputs it signs depends on the SIGHASH flag. The SIGHASH flag is a 4-byte code included at the end of a signature to select which outputs are signed (and thus fixed at the time of signing).

The locking script is sometimes called "scriptPubKey" referring to the fact that it comprises the public key of the party to whom the respective transaction is locked. The unlocking script is sometimes called "scriptSig" referring to the fact that it supplies the corresponding signature. However, more generally it is not essential in all applications of a blockchain 150 that the condition for a UTXO to be redeemed comprises authenticating a signature. More generally the scripting language could be used to define any one or more conditions. Hence the more general terms "locking script" and "unlocking script" may be preferred.

Client Software

Figure 4:
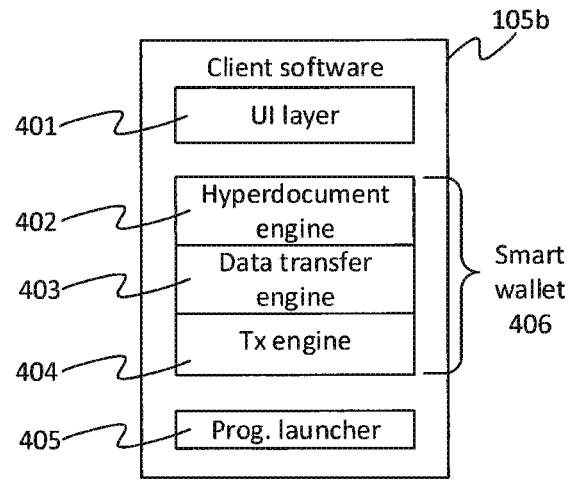
FIG. 4 is a schematic block diagram of a client application, FIG. 5 schematically illustrates a blockchain-based file format in accordance with embodiments herein.

FIG. 4 illustrates an example implementation of the client application 105 for implementing embodiments of the presently disclosed techniques. The client application 105 comprises a transaction engine 404 and a user interface (UI) layer 401. The transaction engine 404 is configured to implement the underlying transaction-related functionality of the client 105, such as to formulate transactions 152, receive and/or send transactions and/or other data over the side channel 301, and/or send transactions to be propagated through the P2P network 106, in accordance with the schemes discussed above. Furthermore, in accordance with embodiments disclosed herein, the transaction engine 401 of at least Bob's client 105b (and potentially other clients) further comprises a data transfer engine 403, a program launcher 405, and optionally a hyperdocument engine 402. Together the hyperdocument engine 402, data transfer engine 403 and transaction engine 404 may form a "smart wallet" function 406 (though the hyperdocument engine 402 is an optional part of this). The functionality of these various modules will be discussed in more detail shortly. The smart wallet function 406 may also be referred to herein as just the "smart wallet" for short.

The UI layer 401 is configured to render a user interface via a user input/output (I/O) means of the respective user's computer equipment 102, including outputting information to the respective user 103 via a user output means of the equipment 102, and receiving inputs back from the respective user 103 via a user input means of the equipment 102. For example the user output means could comprise one or more display screens (touch or non-touch screen) for providing a visual output, one or more speakers for providing an audio output, and/or one or more haptic output devices for providing a tactile output, etc. The user input means could comprise for example the input sensor matrix of one or more touch screens (which could be the same or different as the display used for the output means); one or more cursor-based devices such as mouse, trackpad or trackball; one or more microphones and speech or voice recognition algorithms for receiving a speech or vocal input; one or more gesture-based input devices for receiving the input in the form of manual or bodily gestures; or one or more mechanical buttons, switches or joysticks, etc.

The transaction engine 403 of the smart wallet 406 is operable to access the code of a stored in the payload of transactions 152 on the blockchain 150 (e.g. in an unspendable output in an output-based transaction model), and passes the code therefrom to the program launcher 405. The code launcher 405 runs this code and surfaces any user-visible effects of the program to the user 103b through the UI layer 401. Particularly, in accordance with embodiments disclosed herein, the code launcher 405 is configured to reconstruct a program file from multiple transactions 152 on the blockchain 150, and run the reconstructed program file. This will be discussed in more detail shortly.

Note: whilst the various functionality herein may be described as being integrated into the same client application 105, this is not necessarily limiting and instead they could be implemented in a suite of two or more distinct applications, e.g. one being a plug-in to the other or interfacing via an API (application programming interface). For instance, the functionality of any of the modules 401, 402, 403, 404, 405 may be implemented in two or more separate applications in any combination. Nor is it excluded that some or all of the described functionality could be implemented at, say, the operating system layer. Where reference is made anywhere herein to a single or given application 105, or such like, it will be appreciated that this is just by way of example, and more generally the described functionality could be implemented in any form of software.

Blockchain-Based Program File Format

To support the integration of blockchain technology as a fundamental technological infrastructure, there should preferably be a straightforward process to build and access higher-layer applications. In order to do this, it would be desirable to provide standard data formats for developers to not only include within transactions but to build software to execute code stored within blockchain transactions. This may involve dedicated smart wallets that can readily interact with the blockchain both for data requests and to facilitate the connection of software on a local computer, a central processing unit (CPU) and computer storage. Through being able to integrate blockchain data into conventional programming languages, a wider range of applications can be developed atop the blockchain powering more secure and tamper-proof desktop and mobile applications.

The system disclosed herein facilitates direct interaction between software and the blockchain by providing for a transaction-enabled file format for containing programming languages other than the scripting language used for the locking and unlocking scripts or the like. In contemporary programming languages such as C, C++, and Java, there are objects called pointers that act as references to particular memory addresses. The present disclosure provides an analogous object which may be called a blockchain pointer, that can be integrated into programming languages that acts as a reference to some transaction data or metadata.

Some embodiments may also employ a system for the request and response to data requests via linked hypertext documents referenced by their TxID.

Figure 5:
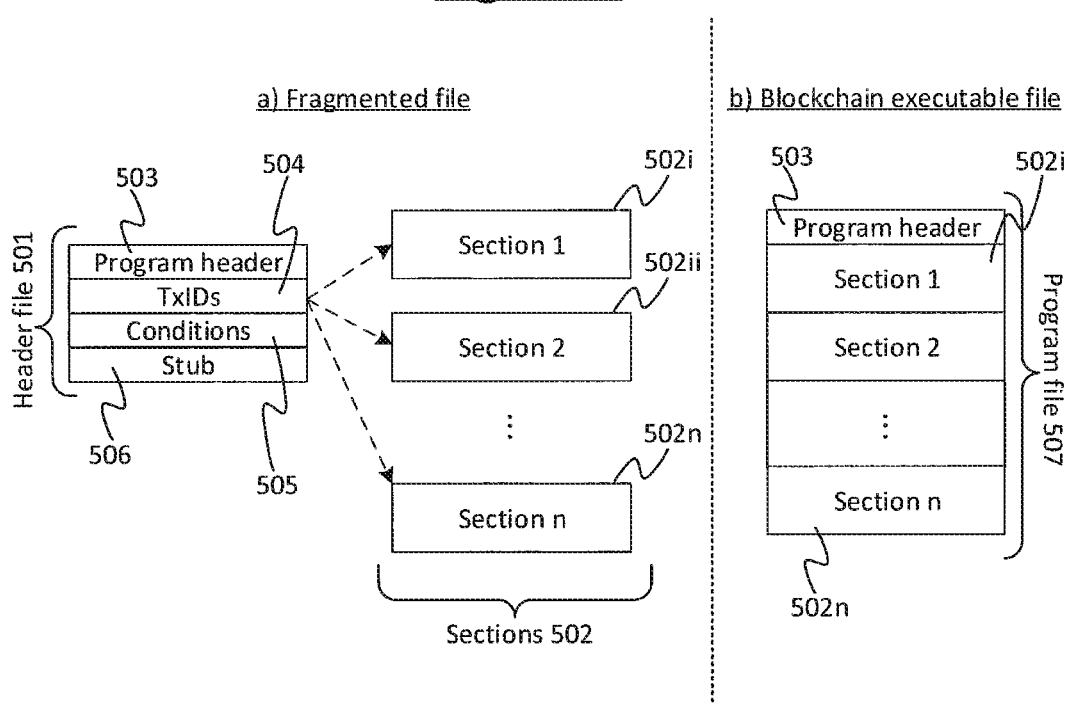

FIG. 5 illustrates a blockchain-based program file format for storing a program file across multiple transactions 152 on a blockchain 150 in accordance with embodiments disclosed herein. The left hand panel a) of FIG. 5 shows the program file in fragmented form as stored across multiple transactions 152 on the blockchain 150. The fragmented form of the program file comprises a header file 501 which is stored in a first transaction 152Y on the blockchain 150, and one or more body sections 502i . . . 502n each of which is stored in a respective second transaction 152Z on the blockchain (see also FIG. 6, to be discussed in more detail later). In an output-based model, each of the header file 501 and body sections 502 may be stored in an un-spendable output (e.g. UTXO) of its respective first or second transaction 152Y, 152Z.

An example of this is illustrated schematically in FIG. 3. In the following example scenarios Alice 103a is the providing party who formulates the first and second transactions 152Y, 152Z and broadcasts them to the blockchain network 106 (either directly or via a third party) in order for them to be recorded on the blockchain 150. Bob 103b is the consuming party who reads the header file 501 and sections 502 from the respective first and second transactions 152Y, 152Z in order to reconstruct the program file 507.

As shown in FIG. 3, in an output-based model the first transaction 152Y comprises at least one input 202Y pointing back to the output of some other, antecedent transaction 152 on the blockchain 150. The output of the antecedent transaction could be an output locked to Alice, i.e. so Alice is paying an amount of the digital asset from herself to have the first transaction 152Y recorded on the blockchain 150. The first transaction 152Y will typically also be required to comprise at least one spendable output $203Y_0$. This will comprise a locking script locking the output $203Y_0$ to a payee. The locking script is formulated in the relevant scripting language recognised by the transaction protocol being employed by the block chain network 106, e.g. the Script language. The amount specified in this spendable output $203Y_0$ could be a dust (i.e. negligible) amount and/or the payee could be Alice herself, i.e. so Alice is paying herself (plus the mining fee) to have the first transaction 152Y recorded on the blockchain 150. Alternatively it is not excluded that a transaction model or protocol could be employed that does not necessarily require a spendable output to be included in every transaction. Either way, the first transaction 152Y also comprises an un-spendable output $203Y_1$. In embodiments, this is implemented by including a special opcode of the scripting language in the locking script of the un-spendable output $203Y_1$. This is an opcode which, when run on one of the nodes 104 of the blockchain network 106, of terminating execution of the locking script in which it is included. This enables any other arbitrary payload, not formulated in the scripting language, to be included in the un-spendable output $203Y_1$ without otherwise affecting the functionality of the transaction 152Y as a transaction on the blockchain network 106.

In accordance with embodiments disclosed herein, this mechanism is used to include the header file 501 in the un-spendable output $203Y_1$ of the first transaction 152Y, and thus store the header file 501 in the first transaction 152Y on the blockchain 150. The header file 501 is formulated in a format or language other than the scripting language (e.g. Script) used in the locking scripts according to the transaction protocol employed by the blockchain network 106.

An analogous mechanism may be used to include each of the body sections 502 in an un-spendable output $203Z_1$ of a respective second transaction 152Z on the blockchain 150. Each body portion 502 comprises program code formulated in a language other than the scripting language (e.g. Script) used in the locking scripts.

In alternative implementations, it is not excluded that the header file 501 and body sections 502 could be included as transaction payloads according to a different mechanism in other transaction protocols or models. For instance, in an alternative implementation, the blockchain network 106 could employ an account-based model, and each of the header file 501 and body portions 502 could be included in a data field or smart contract of a respective transaction 152Y, 152Z. In this case, each of the header file 501 and body sections 502 would be formulated in a language other than that recognised by the nodes 104 for executing smart contracts.

Returning to FIG. 5, the header file 501 comprises at least a portion of program header information 503, and a list of one or more transaction IDs 504. The program header information 503 comprises basic header information for the program file that will form at least part of a header of the program file 507 once reconstructed. This may comprise for example any one, more or all of: a version number of the program, a version number of a target computer system, a size of the program or reconstructed program file, a description, reserved variables, a date/time stamp, and/or a checksum for checking the reconstructed program is free of errors.

The transaction IDs included in the list 504 act as pointers to respective body portions 502 of the program file stored in respective other, second transactions 152Z on the blockchain 150. As shown in the right hand panel b) of FIG. 5, the consuming party Bob 103b reconstructs an instance of the program file 507 in un-fragmented form by combining the header information header 503 with each of the one or more body sections $502i \ldots 502n$ pointed to by the respective transaction IDs 504 included in the header file 501.

In embodiments, the header file 501 may also comprise an indication of one or more conditions 505, and a code stub 506 for evaluating the one or more conditions. The functionality of these portions will be discussed in more detail later.

Figure 6:
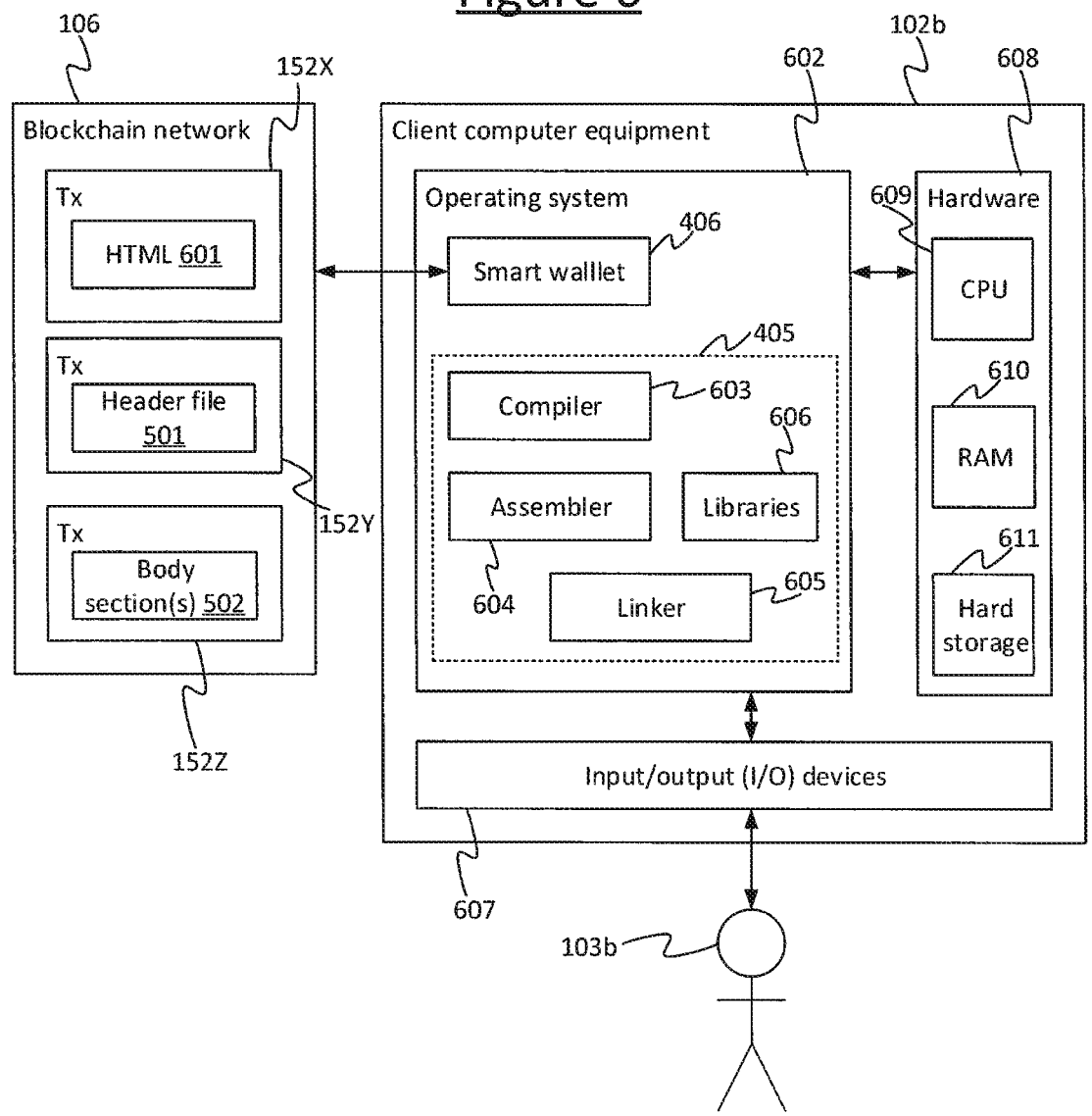
FIG. 6 is a schematic block diagram of an example computer architecture for implementing the presently disclosed techniques.

FIG. 6 shows an example computer architecture of the computer equipment 102b of the consuming party 103b, also referred to herein as the client equipment. This architecture may be implemented locally on a single user device, or may be distributed across multiple devices which could comprise user devices, server resources or a combination thereof.

The client equipment 102b comprises hardware 608, input/output (I/O) devices 607, and software. The hardware 608 comprises at least one processor 609 such as a CPU. The hardware 608 also comprises random access memory (RAM) and hard storage 611 (i.e. non-volatile memory such as a hard disk or solid state drive, SSD). The central processing unit (CPU) 609 comprises electronic circuitry that carries out machine-level instructions by performing arithmetic logic as well as input/output operations. The RAM 610 provides temporary storage of data and machine-level instructions acting as in intermediary between the software and hard disk 611 with the CPU 609.

The user 103b can interact with the input/output devices 607 and the commands are translated to instructions/data, which are relayed to software in the operating system 602. Various options for I/O devices 607 have already been discussed previously with reference to FIG. 4.

The software comprises an operating system 602, and a program launcher 405 and smart wallet function 406 that run on the operating system 602. The operating system 602 comprises system software that manages computer hardware and software resources.

The following definitions may also be adopted herein.

Virtual machine: emulation of a computer system.

System virtual machine: a virtual machine that provides functionality to execute entire operating systems. A hypervisor uses native execution (machine code, directly executed by a computer's CPU) to share and manage hardware, allowing for multiple isolated environments to exist on a single physical machine.

Hypervisor: computer software, firmware, or hardware that creates and runs virtual machines.

Dynamic Linker: part of an operating system that loads and links the shared libraries needed by an executable, when it is executed ("at run time"), by copying the content of libraries from persistent storage to RAM and filling up jump tables and relocating pointers. The specific operating system and executable format determine how the dynamic linker functions and how it is implemented.

Library: a collection of resources used by computer programs (configuration data, documentation, pre-written code as well as subroutines, classes, values or type specifications).

Shared Library: a file that is shared by executable files and further shared object files. Modules used are loaded from individual shared objects into memory at run time rather than being copied by a linker when it creates a single monolithic executable file for the program.

Assembler: a computer program that creates object code by translating combinations of mnemonics and syntax for operations and addressing modes into their numerical equivalence (machine code).

Compiler: a computer program that transforms computer code written in one programming language into another (typically from a high-level to lower level language) to create an executable program.

Executable file or executable program: a file that causes a computer to perform indicated tasks according to encoded instructions. Note also that most generally, the term "execute" or "executable" herein can refer to any manner of running software, and does not necessarily limit to execution of low-level machine-code instructions or such like, for example. E.g. "execute" herein could also refer to compiling and then running a high-level language, assembling and then running an assembly level language, or interpreting an interpreted language.

FIG. 6 also illustrates transactions 152 of the blockchain 150 stored on the blockchain network 106, including the first transaction 152Y and the second transaction(s) 152Z.

In operation, the consuming party Bob 103b uses at least one of the I/O devices 607 to select to access the header file 501 from the first transaction 152Y as stored on the blockchain 150 (it will be appreciated that "first" and "second" as used herein in this context are just arbitrary labels). In some embodiments, this may be achieved by selecting a hyperlink in a hypertext document 601. For instance, this may be formulated in HTML, but augmented with an additional type of tag that enables a link to a transaction ID of a transaction 152 on the blockchain 150, instead of to an URL as in conventional hyperlinks. In such embodiments the hypertext engine 402 of the smart wallet 406 renders the hypertext document 601 to Bob through the UI layer 401, and detects the selection of the hyperlink. In response, it triggers the data transfer engine 403 of the wallet 406 to retrieve the header file 501 from the linked-to transaction (the first transaction 152Y) on the blockchain 150 via the blockchain network 106 (by querying a storage node 104S).

The hypertext document 601 could be accessed from a local store on Bob's computer equipment 102b or via the Web. Alternatively, the hypertext document 601 itself could be stored as payload data in a source transaction 152X on the blockchain 150, e.g. in an unspendable output in an output-based model. In this case, in a preliminary step the data transfer engine 403 accesses the hypertext document 601 from the source transaction 152X on the blockchain via the blockchain network 106, and passes it to the hypertext engine 402 to render to the user 103b.

In alternative embodiments, it is not necessary to use a hypertext document 601 to link to the header file 501. Instead the data transfer engine 403 may retrieve the header file 501 by querying the blockchain 150 directly in a known fashion. E.g. a spendable output $203Y_O$ of the first transaction 152Y (perhaps for a dust amount) may be addressed to Bob 103b, thus enabling him to find it on the blockchain 150 using conventional wallet functionality. And/or Alice 103a or a third party may signal the address of the first transaction 152Y to Bob over an off-chain side channel (not shown). In such embodiments the hypertext engine 402 is not needed as part of the wallet function 406.

By whatever means accessed, the header file 501 is retrieved by the data transfer engine 403 of the wallet 406 and passed to the program launcher 405. The program launcher 405 is configured to read the one or more transaction IDs 504 from the retrieved header file 501 and use these as pointers, in order to cause the data transfer engine 403 of the wallet 406 to retrieve the respective body section(s) 502 from the respective second transaction(s) 502 on the blockchain (again by querying a storage node or nodes 104S). The program launcher 405 then combines the program header information 503 with the one or more retrieved body sections 502 in order to reconstruct the program file 507. The program launcher 405 may the run the reconstructed program file. Alternatively or additionally it could store the reconstructed program file 507 in memory 611 or back in another transaction 152 on the chain 150, and/or it could communicate the reconstructed file 507 to a third party for them to run or store.

At least part of at least one of the body sections 502 comprises program code of the desired application. In embodiments, one or more of the body sections 502 may also comprise data to be operated on by the program code (i.e. target data or operand data), and/or one or more libraries for use in compiling and/or linking the program code.

The program code of the body section(s) 502 of the program file 507 may be written in any suitable language such as C, C++, Java Script, Python, Basic, etc. It is written in a language other than the scripting language used for the locking scripts (e.g. Script). Hence this code may be referred to in embodiments as non-Script code. The program may have any application function desired by the developer, e.g. a game, office tool, communication client, or diagnostic tool, etc. The consuming party 103b could be an end user or an operator of a node 104 such as a miner. The consuming equipment (client equipment) 102b may comprise user equipment, server resource, or a combination thereof. In some cases the consumer equipment 102b may additionally take the role of a node 104 of the blockchain network 106 rather than being a pure consumer.

In embodiments, the program launcher 405 may take the form of a virtual machine. It may comprise a compiler 603, assembler 604 and/or linker 605. It may comprise one or more pre-stored libraries 606. The running of the program file 507 may comprise compiling high-level code, assembling assembly-level code, and/or linking. In the case of linking this may comprise linking between sections 502 from different transactions, linking parts within a given section 502, and/or linking with one of the pre-stored libraries 606. In further alternative embodiments, the running of the program file 507 may comprise interpreting high-level code of an interpreted language. In yet another alternative, the program could already comprise low-level machine code in which case the running comprises executing the machine code.

Note: it is also not excluded that the header file 501 itself could include a body section (not shown) comprising part of the program code, which may be included as one of the sections in the final reconstructed program file 507 along with the one or more body sections 502 pointed to by the transaction IDs 504.

In embodiments, the header file 501 may optionally comprise a portion 505 specifying one or more conditions for running one, more or all of the body sections 502. These control under what circumstances the body section(s) 502 can be run. For instance these may comprise one or more access conditions determining who can access one, more or all of the body sections in order to reconstruct or run the file. More generally the conditions 505 could comprise any conditions associated with one, more or all of the body sections 502; e.g. a compatibility condition such as a conduction on what operating system the client equipment 102b is using (e.g. to check Bob is not trying to run a windows program on a mac), or whether the client equipment 102b has sufficient memory. Preferably the header file 501 also comprises a code stub 506 for evaluating the conditions 505. This is not one of the body sections 502 and does not need to be included in the final reconstructed program file 507. Instead, the code stub 506 is automatically run by the code launcher when the header file 501 is retrieved from the blockchain 150. Like the body sections however, the code stub 506 may be written in a language other than the scripting language used for the locking scripts (e.g. a non-Script language).

When run, the code stub 506 implements the relevant functionality for evaluating the conditions 505. Alternatively it is not excluded that the evaluation is performed by pre-stored code on Bob's equipment 102b, or even by Alice or a third party. Note also that while show schematically as separate elements in FIG. 5, in some embodiments that do employ the code stub 506, then the conditions 505 could be integrated into the stub 506 as an integral part of the code of the stub 506. Alternatively however, the conditions 505 could indeed be specified in a distinct portion of the header file 501 and referenced by the code stub 506.

The conditions 505 may for example comprise one or more access conditions, whereby access to one or more of the body sections 502 is conditional on the identity of the consuming party 103b who is attempting to reconstruct the program file 107. In this case the evaluation comprises checking that the identity of the consuming party 103b is the same as an identity specified in the access conditions 505. It may also comprise authenticating the identity of the consuming party 103b. Suitable authentication and identity checking techniques will, in themselves, be familiar to a person skilled in the art.

As another alternative or additional example, the conditions 505 may comprise one or more compatibility conditions, being conditions on the compatibility of the client computer equipment 102b of the consuming party 103b who is attempting to reconstruct the program file 107 (i.e. compatibility with one or more of the body sections 502). In this case the evaluation comprises checking that the computer equipment 102b meets one or more technical specifications specified in the compatibility conditions 505. Suitable compatibility checking techniques will, in themselves, be familiar to a person skilled in the art.

If the condition(s) 505 specified in the header file 501 is/are not met, then the code launcher 405 will either i) not access one, more or all of the body sections 502 from the blockchain 150 at all; or ii) at least will not include it/them in the final reconstructed program file 507. This may mean no program file 507 is reconstructed, or that a version of the program file 507 with only reduced functionality is created (lacking any body sections 502 for which the consuming party 103 and/or his computer equipment 102b did not meet the associated condition(s) 505).

In embodiments the list 504 in the header file 501 points to a plurality of transaction IDs storing a plurality of body sections for the program file 507. In some such embodiments, there may be different respective condition 505 associated with different ones of the body portions. This can be used to create different tiers of access. An example application of this would be a program that reads from and writes to a text file. The "READ" function and "WRITE" function can be two separate parts of the code, each with their own access control.

In some embodiments the header file 501 could be stored on the chain 150 in encrypted form, encrypted based on a shared secret shared between Alice and Bob. This enables only Bob (and anyone else who knows the shared secret), but not the general public, to access the header file 501 and thus reconstruct the program file 507. The shared secret could be obtained by means of a key negotiation process conducted between Alice and Bob over an off-chain side channel (not shown), or via an on-chain process. Alternatively in other embodiments, the header file 501 need not be encrypted and may instead be made freely available to the general public via the blockchain 150.

Data stored in a transaction can remain in the UTXO set. In embodiments, to update the information, one can spend the output containing the data. The previous data is recorded on the blockchain, but only the latest information is in the UTXO set. Therefore, a blockchain pointer can always reference the data stored in the UTXO set as the latest data.

A record of the most up-to-date UTXOs is stored in a UTXO set at each storage and/or mining node 104S, 104M. This is a reflection of the latest state of blockchain 150, typically kept by all miners and some nodes that store an entire copy of the blockchain 150. Once recorded on a blockchain an existing transaction cannot be modified. Instead therefore, in embodiments an update can be implemented by later adding a new transaction to the chain, wherein the new transaction spends a spendable output of the existing transaction which stores the data that is being updated. Therefore existing transaction (the one being updated) would contain at least a spendable output (and possibly an unspendable output if the data is included under an OP_RETURN or the like). Once validated, the spendable output is included in the UTXO set which is maintained at some or all of the storage and/or mining nodes 104S, 104M. To update, one would spend the spendable UTXO of the existing transaction and include the updated data in the new transaction (e.g. again in a new unspendable output of the new transaction using an OP_RETURN opcode or the like). Once validated, this new transaction is now included in the UTXO set. Therefore, the latest information will always be available in the UTXO set maintained by each storage and/or mining node 104S/M.

Some example implementation details of the above-described concepts are now discussed in more detail.

An executable file consists of assembly-level code along with any data, libraries, or scripts that are required by the code at run-time. Typically, this is organized in a standardized format depending on the operating system. For example, portable executable (PE) format in Windows, as well as the executable and linkable format (ELF) in Linux. Although the structure varies by format, it typically consists of the following components:

- a program header specifying information such as machine and version information, file size, and pointer to file data;
- a section header table referencing the data included in the file; and
- a data section including the code and other requirements for execution.

Specified in the file are the references to the memory addresses where the required data is stored. This file and each of its dependencies are stored on the disk and reconstructed in the memory at runtime based on the instructions specified in the file.

Herein, there is disclosed an analogous executable file format where, in place of storing the file and dependencies on a local disk, it is stored in a decentralized manner on a blockchain. This file format may be referred to herein as the blockchain executable format (BEF).

The assembly level code, required libraries and possibly even import data are stored, compressed and referenced on the blockchain 150. Each component is stored in a separate transaction 152 and the header file 501 would only have to keep the TxID(s) 504 along with any header info 503, conditions 505 and/or stub 506. The construction, linking and execution processes can all be performed by an integrated smart wallet/virtual machine as shown in the figure below.

The header file 501 has a header 503 containing some or all of the information listed above (version, checksum etc.). When fragmenting the BEF file 507, the executable file stub 506 and header 503 are stored in a single transaction 152Y along with the TxIDs 504 needed for reassembly and any access checks 505. This transaction 152Y can also be called a compressed version of the file 507. The stub 506 is the executable code that checks the access conditions for the entire file 507.

The BEF execution would occur as follows. The method is also illustrated in FIGS. 7A to 7B.

Figure 7A:
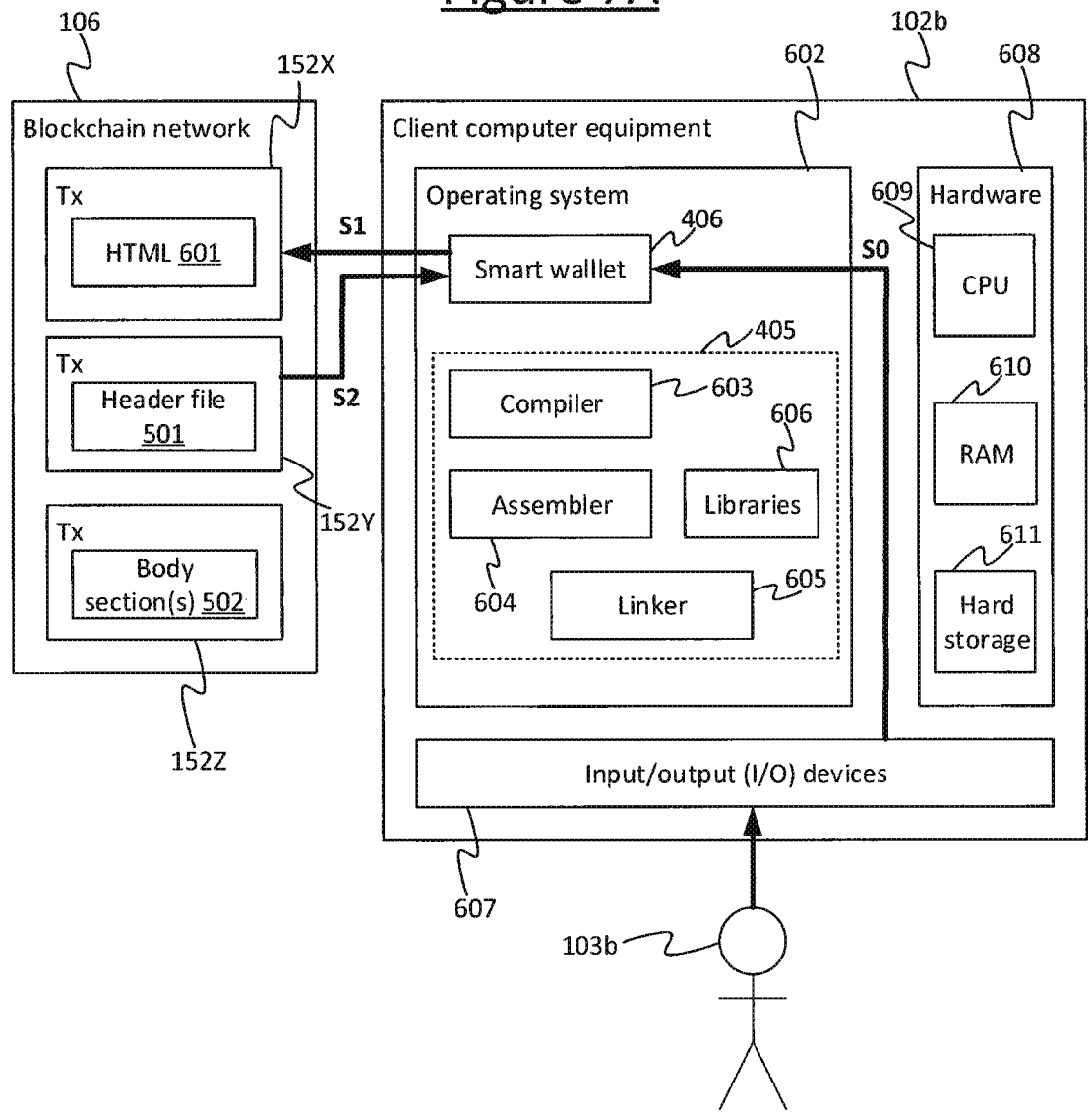
FIGS. 7A-7B show an example process for accessing and reconstructing a runnable program file in accordance with embodiments disclosed herein.
Figure 7B:
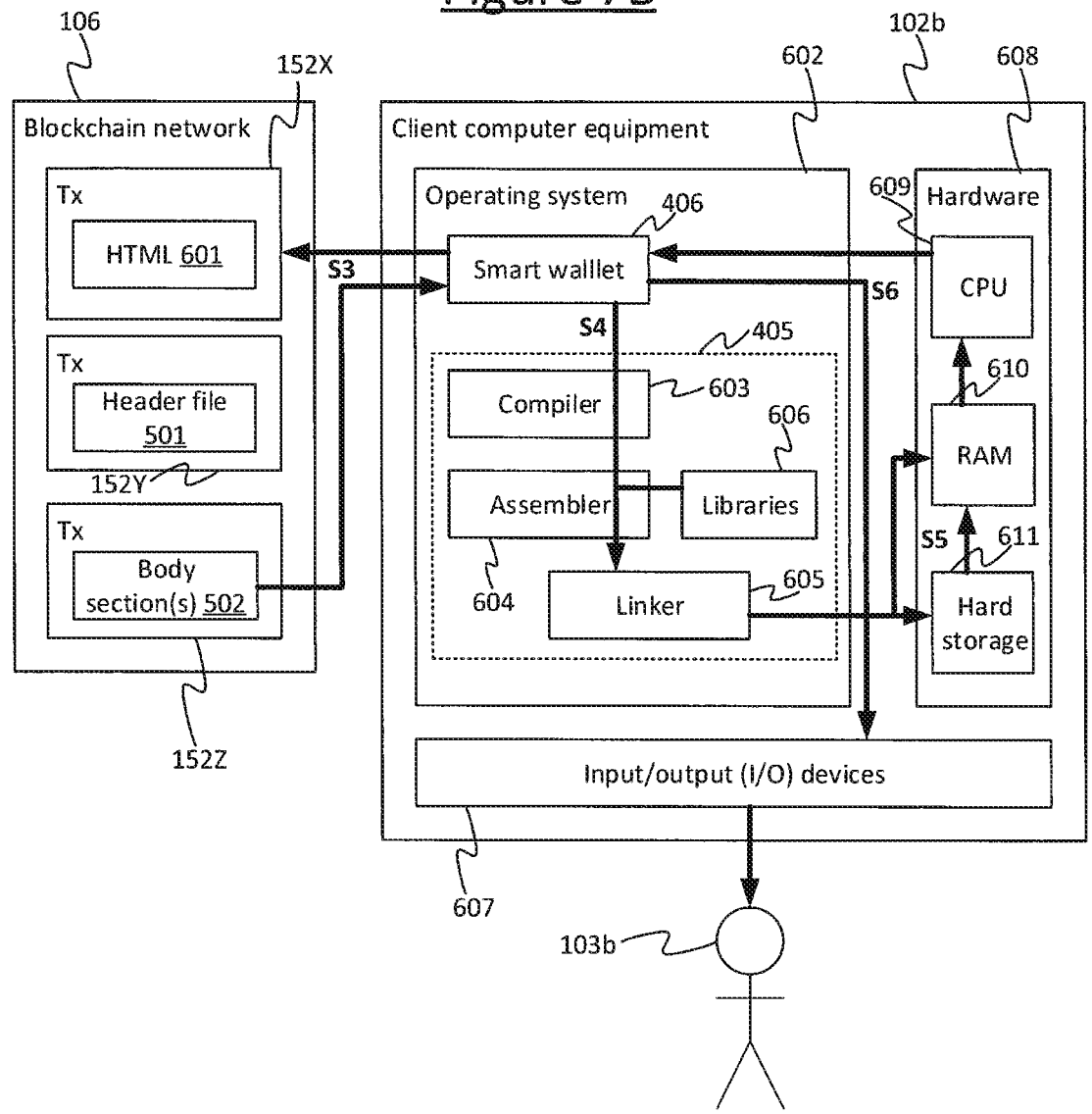

In the steps of FIG. 7A, the initial file request is initiated from a previous blockchain-embedded HTML document, user input or locally-running code, and sent to the blockchain network 106. In response the header file 501 is returned and interpreted by the smart wallet 406.

At step S0, the TxID of the transaction containing the header file 501 is selected by the user 103b. This can be done via an existing hyperlink in a hypertext document, locally-saved address, or blockchain pointer in code being executed locally.

At step S1, the smart wallet 406 requests a BEF file via a TxID request that refers to the transaction 152Y containing the header file 501.

At step S2, the network 106 responds with the transaction information and is interpreted by the smart wallet 406.

The steps of FIG. 7B show how the smart wallet checks compatibility and verification conditions 505 laid out in the header file 501. E.g. this may be done by running the stub 506. If all requirements are met, the wallet 406 requests the parts of the body 502 addressed in the TxID list 503 of the header file 501, and the executable file 507 is assembled locally. The executable file, along with any local libraries required, are passed to the linker 605, which then creates a file in memory 610 or 611 and executed on the CPU 609. The results can be presented the user though the UI device(s) 607, written to the blockchain 150 or used in an additional script.

At step S3, on seeing the file format structure flag in the retrieved transaction, the wallet 406 interprets BEF file 507 and requests any further transactions referenced in the BEF document, if any (checking any access/key conditions if applicable).

At step S4, the assembled file 507, and any local libraries, are passed to the linker 605 in the virtual machine 405.

At step S5, machine code and any data are pulled from disk 611 at runtime, assembled in memory 610 and executed on the CPU 609.

At step S6, the output is interpreted according to the program code, which may include (but not limited to): i) display output to user 103b, ii) push to a stack for in-Script computations, iii) feed as input into another code running in the virtual machine 405, and/or iv) writing to the blockchain 150 via another transaction created by the smart wallet 406 as new data or to update existing data.

The structure of the BEF file is shown in FIG. 5. Here is presented the expected format of a BEF file to be interpreted by the smart wallet 406. The assembled structure 507 resembles a conventional Windows PE file but for compression, the file is deconstructed into several different transactions allowing data to managed independently and restrict access if desired. The header file 501 contains all necessary TXID pointers 504 for reconstruction. The left-hand panel a) of FIG. 5 shows the fragmented executable file distributed across several transactions 152Y, 152Z. The header file 501 includes the STUB program 506, the header details 503 and references 504 to the transactions holding the SECTIONS table and data needed for execution. The right-hand structure shows the locally assembled structure.

The stub 506 can be used to control where the file 507 can be executed or under which conditions. The rest of the header file 501 may also contain code that determines the flow and format of the resulting program. This can be a simple loader or can use multiple UTXOs and transactions. The interpreted code can be segmented into different forms of software depending on user interaction or for pre-defined automata use cases. The header file 501 can have the following form. This shows the parts 503, 504 and 505. The stub 506 can be appended onto this format.

| Variable Type | Value |
|---|---|
| Unsigned Short Integer | Version and System #. |
| Unsigned Short Integer | Pages in file (# of UTXO links) |
| Unsigned Short Integer | Relocations |
| Unsigned Short Integer | Size of Header |
| Unsigned Short Integer | Minimum Extra Sections |
| Unsigned Short Integer | Maximum Extra Sections |
| Unsigned Short Integer | UTXO – Relocation Table |
| Unsigned Short Integer | Overlay (#) |
| Unsigned Short Integer | Checksum |
| Unsigned Short Integer | Reserved Sections/Extensions |
| Long Integer | Ordering information + Verification Conditions |

The UTXO relocation table is the list of pointers 504 to one or more sections in one or more other transactions 152Z. In this implementation it actually identifies specific UTXOs within the referenced TxIDs, not just the TxIDs. So for example it would reference unspendable $UTXO_1$ of $TxID_Z$.

The end of the header includes ordering information for the different sections 502. When multiple sections 502 are to be assembled, an order should be maintained for execution as with standard compilation/execution). This may be implemented by including an assemble sequence in the header file 501 (e.g. in the header information 501).

Alternatively, that the header file 501 may only contain a pointer to a single other TxID. In this case, if there are multiple sections 501 to assemble, then each but the last section 502 will itself contain a small header portion comprising at least a pointer to the next TxID in an ordered chain. The program launcher 405 will then follow each pointer in the chain in order to collect together all the sections 502 for reconstructing the overall file 507. In embodiments the header portion of each section 502 could comprise some or all of the same format as the header file 501, such as the format shown in the above table. A combination of approaches could also be used. E.g. so the header file 501 contains a list 504 to some sections 502 of the overall file 507, and at least one of those sections itself contains a header portion pointing to one or more other sections. Again the program launcher 405 follows each pointer in order to collect the sections 502 required to reconstruct the overall file 507.

For instance, the ordering information at the end of the above header format may comprise a reference to the next part of the file that can be stored in a separate transaction and retrieved by the wallet 406 should certain verification conditions be met. This may have an error for incorrect use and can flag the need for signatures or that a UTXO following this is not of the correct type or needs permissions such as keys or fulfilment of a payment condition.

This may be implemented in form of a key validation or a selective decryption function such as XOR-based decryption. Upon reconstructing the code from one or more data sources in one or various UTXOs on the blockchain, the method jumps to an OEP (original execution point) after the code has been assembled. This executable is then passed to the linker 605 and executed on the local computer. The data is loaded as an initial disk image file (such as ISO) and is reconstructed in a virtual machine or possibly a browser.

The header file 501 is constructed independently in a single initiating transaction that can be read either publicly or with a selected key (such as an XOR-encrypted software link, or encoded as disclosed in PCT/IB2017/050856). This information, received and interpreted by the smart wallet 406, allows the virtual machine 405 to determine the version of software and ensure compatibility. An example of the way it does this is explained in the next paragraph.

Executing a stub program: as defined above, the smart wallet 406 incorporated into a device, a virtual machine, or browser takes the information and determines it is an executable image file via a reference flag in the transaction. The first part of the BEF file to be executed is the STUB, similar to that of the PE format. In the PE format, the DOS STUB verifies that the file is not being executed in DOS, and if it is, prints "This program cannot be run in DOS mode." and stops execution. In the context of the BEF file, the STUB can be used to specify the running environment (Windows, Linux, or a specified virtual machine) and can even be used to initiate access authentication. The client credentials can be interpreted and if insufficient information is presented for access on say a secure area of the virtual machine, the STUB program can be used to prompt the user for identity verification such as a username and password. A protocol can also be specified in the case of failure to prove access credentials such as: I) printing a message to the user and terminating execution, II) limited functionality by assembling only specified parts of the execution data, III) limited access to input data, and/or IV) blacklisting the IP address that was attempting to access the executable file.

CONCLUSION

It will be appreciated that the above embodiments have been described by way of example only.

More generally, according to one aspect disclosed herein there is provided a method of running a program, the method comprising, by computer equipment of a consuming party: retrieving a header file from a first transaction recorded on a blockchain maintained across a plurality of nodes of a blockchain network. The header file comprises program header information, and reference information comprising one or more respective transaction IDs of one or more respective second transactions stored on the blockchain, wherein each of the second transactions comprises a respective section of a body of the program file, at least one of the sections comprising runnable program code. The method further comprises, from the blockchain, retrieving the respective section of the program file from at least one of the one or more second transactions based on the reference information; and running a program comprising the program header information and the at least one retrieved section.

In embodiments, said running of the program may comprise: reconstructing a program file comprising said program from the header information and the at least one retrieved section, storing the reconstructed program file in memory of the computer equipment of the consuming party, and running the reconstructed program file on the computer equipment of the consuming party.

Alternatively the consuming party could execute each section individually and then pass on to the next section without assembling everything as a single executable file.

In embodiments the code may comprise assembly-level code and the running may comprise assembling the assembly-level code and executing the assembled code. Alternatively, in embodiments the code may comprise a high-level language and the running may comprise compiling the high-level code of the program file and executing the compiled program, e.g. using just-in-time (JIT) compilation. As another alternative, the program file may comprise raw machine code and the running may comprise executing the machine code. In yet another alternative the code may comprise a high-level language and the running may comprise interpreting high-level code.

In embodiments the running may further comprise linking, e.g. linking between different sections from different transactions, or between different subsections within a given section from a given transaction.

In embodiments, said reference information may comprise a plurality of transaction IDs of a plurality of second transactions each storing a respective body section of the program file.

The different sections may comprise program code, one or more libraries, and/or data to be operated upon by the program.

In embodiments, said retrieving may comprise retrieving, from the blockchain, the respective sections from two or more of the plurality of second transactions; and the program that is run may comprise the program header information and the retrieved sections from the two or more second transactions.

Alternatively the reference information in the header file could comprise only a single transaction ID referencing only a single body section in a single second transaction.

In embodiments, at least one of the body sections in at least one of the second transactions may itself comprise a header portion comprising at least a reference to a third transaction containing a further body section. In this case, the program that is run may comprise the program header and the body sections from the second and third transactions.

In embodiments, the header file may further comprise one or more conditions; and the method may comprise evaluating the conditions, wherein the retrieval or the running of at least one of the sections of the program is conditional on an outcome of the evaluation.

In embodiments the evaluation may be performed by the computer equipment of the consuming party.

In embodiments, the header file may comprise a runnable code stub for evaluating the one or more conditions. In this case the method may comprise running the code stub on the computer equipment of the consuming party in order to perform said evaluation. In embodiments, the conditions may comprise at least one access condition, being a condition on an identity of the consuming party. In this case the evaluation comprises: verifying that the identity of the consuming party matches an identity specified by the at least one access condition, wherein the retrieval or the running of at least one of the sections of the program is conditional on a positive outcome of the verification.

In embodiments, the conditions may comprise at least one compatibility condition, being a condition on a compatibility of the computing equipment of the consuming party. In this case the evaluation comprises: checking that the computer equipment of the consuming party meets one or more technical criteria specified by the compatibility condition, wherein the retrieval or the running of at least one of the sections of the program is conditional on a positive outcome of the check.

The technical criteria for compatibility could comprise one or more criteria placed on the hardware of the computer equipment of the consuming party. Alternatively or additionally, the technical criterial for compatibility could comprise one or more criteria placed on the software installed on the computer equipment of the consuming party, e.g. one or more criteria on the operating system, and/or one or more criteria for one or more sister applications that need to be installed.

In embodiments, the conditions may comprise a respective condition associated with each of the plurality of sections, at least some of the respective conditions being different to one another. The method may comprise evaluating the conditions associated with each of at least some of the plurality of sections, wherein the retrieval or running of each such section is conditional on the outcome of the evaluation.

This advantageously provides for different tiers of access or operability, whereby some sections are made available for use and some not on a modular basis, depending on the conditions (e.g. depending on the identity of the consuming party).

In embodiments the conditions may comprise a respective access condition on an identity of the consuming party for each of some or all of the sections, the evaluation comprising verifying that the identity of the consuming party matches a respective identity specified by the respective condition for each respective section, wherein the retrieval or the running of the respective section is conditional on a positive outcome of the respective verification.

In embodiments the conditions may comprise a respective compatibility condition on a compatibility of the computer equipment of the consuming party with the respective section for each of some or all of the sections, the evaluation comprising verifying that the computer equipment of the consuming party meets a respective one or more technical criteria specified by the respective condition for each respective section, wherein the retrieval or the running of the respective section is conditional on a positive outcome of the respective check.

In further alternative or additional embodiments, since the non-script code is more versatile than the locking/locking scripts typically used in blockchain transactions, then the one or more access conditions may comprise any user-defined condition that the developer wishes.

In embodiments the program header information may comprises one or more of: a version number of the program file, a version number of system upon which the program file is to be run, a size of the program file, a description, a list of reserved variables, a date and/or time stamp, a checksum, and/or ordering information for the body sections.

E.g. in embodiments the program header information comprises a minimum of the version and size information.

In embodiments, the blockchain and blockchain network may be configured to operate according to an output-based model, wherein each transaction comprises at least one output and at least one input, each output comprising a locking script and each input comprising a pointer to an output of another transaction and an unlocking script for unlocking the locking script of the pointed-to output, wherein the scripts are formulated in a scripting language. In this case the header file and said program code may be formulated (written) in a language other than the scripting language.

In embodiments, each of the header file and the one or more sections may be stored in at least one unspendable output of the respective first or second transaction on the blockchain.

For instance, each unspendable output may be made unspendable by inclusion of an opcode of the scripting language that terminates the script when run by a node of the blockchain network. E.g. said opcode may be OP_RETURN (the scripting language being Script).

In embodiments, said reference information in the header file may comprise an identifier of an individual respective output within each second transaction, and the retrieval may comprise retrieving each of the retrieved sections from the identified output.

In embodiments, the header file as stored in the first transaction may be stored in encrypted form, encrypted based on a shared secret shared between the consuming party and a providing party who provides the program. In this case, the retrieval of the header file comprises decrypting the header file based on the shared secret.

Alternatively the header file could be unencrypted and thus freely available on the chain to the public.

According to another aspect disclosed herein, there is provided a computer program embodied on computer-readable storage and configured so as when run on the computer equipment of the consuming party to perform any of the method steps disclosed herein.

According to another aspect, there is provided the equipment of the consuming party, comprising: memory comprising one or more memory units, and processing apparatus comprising one or more processing units; wherein the memory stores code arranged to run on the processing apparatus, the code being configured so as when run to perform the method of the consuming party according to any embodiment disclosed herein.

According to another aspect disclosed herein, there is provided a group of transactions for recordal in a blockchain, the group comprising, embodied on a computer-readable data medium or media: a first transaction comprising a header file, and one or more second transactions each comprising a respective section of a body of the program file, at least one of the sections comprising runnable program code; wherein the header file comprises program header information and a set of one or more respective transaction IDs of one or more of the second transactions stored on the blockchain, enabling a program file to be constructed from the program header information and at least one of the sections.

According to another aspect disclosed herein, there may be provided a method comprising the actions of the first party, second party, any third party that may be involved, and/or the network of nodes.

According to another aspect disclosed herein, there may be provided a system comprising the computer equipment of the first party, the computer equipment of the second party, the computer equipment of any third party, and/or the network of nodes.

Other variants or use cases of the disclosed techniques may become apparent to the person skilled in the art once given the disclosure herein. The scope of the disclosure is not limited by the described embodiments but only by the accompanying claims.

The invention claimed is:

1. A method of running a program, the method comprising, by computer equipment of a consuming party: retrieving a header file of a program file from a first transaction recorded on a blockchain maintained across a plurality of nodes of a blockchain network, the header file comprising: program header information, and reference information comprising one or more respective transaction identifiers (IDs) of one or more respective second transactions stored on the blockchain, wherein each respective one of the second transactions comprises a respective section of respective sections of a body of the program file, at least one respective section of the respective sections comprising runnable program code; from the blockchain, retrieving the respective section of the program file from at least one of the one or more respective second transactions based on the reference information; and running a program comprising the program header information and the at least one retrieved section.

2. The method of claim 1, wherein said running of the program comprises: reconstructing a program file comprising said program from the header information and the at least one retrieved section, storing the reconstructed program file in memory of the computer equipment of the consuming party, and running the reconstructed program file on the computer equipment of the consuming party.

3. The method of claim 1, wherein said reference information comprises a plurality of transaction IDs of a plurality of second transactions each storing a respective body section of the program file.

4. The method of claim 3, wherein: said retrieving of the respective sections comprises retrieving, from the blockchain, the respective sections from two or more of the plurality of second transactions; and the program that is run comprises the program header information and the retrieved sections from the two or more second transactions.

5. The method of claim 1, wherein: at least one of the body sections in at least one of the second transactions itself comprises a header portion comprising at least a reference to a third transaction containing a further body section; and the program that is run comprises the program header and the body sections from the second and third transactions.

6. The method of claim 1, wherein the header file further comprises one or more conditions; and the method comprises evaluating the conditions, wherein the retrieval or the running of at least one of the sections of the program is conditional on an outcome of the evaluation.

7. The method of claim 6, wherein the evaluation is performed by the computer equipment of the consuming party.

8. The method of claim 7, wherein the header file comprises a runnable code stub for evaluating the one or more conditions, the method comprising running the code stub on the computer equipment of the consuming party in order to perform the evaluation.

9. The method of claim 6, wherein the conditions comprise at least one access condition, being a condition on an identity of the consuming party; the evaluation comprising verifying that the identity of the consuming party matches an identity specified by the at least one access condition, wherein the retrieval or the running of at least one of the sections of the program is conditional on a positive outcome of the verification.

10. The method of claim 6, wherein the conditions comprise at least one compatibility condition, being a condition on a compatibility of the computing equipment of the consuming party; the evaluation comprising checking that the computer equipment of the consuming party meets one or more technical criteria specified by the compatibility condition, wherein the retrieval or the running of at least one of the sections of the program is conditional on a positive outcome of the checking method step.

11. The method of claim 6, wherein: said reference information comprises a plurality of transaction IDs of a plurality of second transactions each storing a respective body section of the program file; the conditions comprise a respective condition associated with each of the plurality of respective sections, at least some of the respective conditions being different to one another; and the method comprises evaluating the conditions associated with each of at least some of the plurality of sections, wherein the retrieval or running of each such section is conditional on the outcome of the evaluation.

12. The method of claim 11, wherein the conditions comprise a respective access condition on an identity of the consuming party for each of some or all of the sections, the evaluation comprising verifying that the identity of the consuming party matches a respective identity specified by the respective condition for each respective section, wherein the retrieval or the running of the respective section is conditional on a positive outcome of the respective verification.

13. The method of claim 6, wherein: wherein said reference information comprises a plurality of transaction IDs of a plurality of second transactions each storing a respective body section of the program file; and the conditions comprise a respective compatibility condition on a compatibility of the computer equipment of the consuming party with the respective section for each of some or all of the sections, the evaluation comprising verifying that the computer equipment of the consuming party meets a respective one or more technical criteria specified by the respective condition for each respective section, wherein the retrieval or the running of the respective section is conditional on a positive outcome of the respective check.

14. The method of claim 1, wherein the program header information comprises one or more of: a version number of the program file, a version number of system upon which the program file is to be run, a size of the program file, a description, a list of reserved variables, a date and/or time stamp, a checksum, and/or ordering information for the body sections.

15. The method of claim 1, wherein the blockchain and blockchain network are configured to operate according to an output-based model, wherein each transaction comprises at least one output and at least one input, each output comprising a locking script and each input comprising a pointer to an output of another transaction and an unlocking script for unlocking the locking script of the pointed-to output; wherein the locking and unlocking scripts are formulated in a scripting language, and wherein the header file and said program code is formulated in a language other than the scripting language.

16. The method of claim 15, wherein each of the header file and the one or more sections is stored in at least one unspendable output of the respective first or second transaction on the blockchain.

17. The method of claim 15 or 16, wherein said reference information in the header file comprises an identifier of an individual respective output within each second transaction, and the retrieval comprises retrieving each of the retrieved sections from the identified output.

18. The method of claim 1, wherein the header file as stored in the first transaction is stored in encrypted form, encrypted based on a shared secret shared between the consuming party and a providing party who provides the program; and wherein the retrieval of the header file comprises decrypting the header file based on the shared secret.

19. A computer program embodied on computer-readable storage and configured so as when run on computer equipment of a consuming party to perform a method of: retrieving a header file from a first transaction recorded on a blockchain maintained across a plurality of nodes of a blockchain network, the header file comprising: program header information, and reference information comprising one or more respective transaction identifiers of one or more respective second transactions stored on the blockchain, wherein each respective one of the second transactions comprises a respective section of respective sections of a body of a program file, at least one respective section of the respective sections comprising runnable program code; from the blockchain, retrieving the respective section of the program file from at least one of the one or more respective second transactions based on the reference information; and running a first program comprising the program header information and the at least one retrieved section.

20. Equipment of a consuming party, comprising: memory comprising one or more memory units, and processing apparatus comprising one or more processing units; wherein the memory stores code arranged to run on the processing apparatus, the code being configured so as when run to perform a method of: retrieving a header file from a first transaction recorded on a blockchain maintained across a plurality of nodes of a blockchain network, the header file comprising: program header information, and reference information comprising one or more respective transaction identifiers of one or more respective second transactions stored on the blockchain, wherein each respective one of the second transactions comprises a respective section of respective sections of a body of a program file, at least one respective section of the respective sections comprising runnable program code; from the blockchain, retrieving the respective section of the program file from at least one of the one or more respective second transactions based on the reference information; and running a program comprising the program header information and the at least one retrieved section.

\* \* \* \* \*